United States Patent [19]

Zhao et al.

[11] Patent Number: 5,736,370

[45] Date of Patent: Apr. 7, 1998

[54] COMPUTER SYSTEM FOR CONTROLLING VALUES OF OPERATIONAL PARAMETERS DURING AN OPERATION

[76] Inventors: Xi Zhao, 16336 W. La Chiquita Ave., Los Gatos, Calif. 95032; Guobing Jin, 3317 Onslow Way, San Jose, Calif. 95132

[21] Appl. No.: 548,145

[22] Filed: Oct. 25, 1995

[51] Int. Cl.$^6$ .................................................. C12N 13/00
[52] U.S. Cl. ........................... 435/173.6; 435/285.1; 435/172.2; 935/52; 204/DIG. 9; 204/547; 205/701
[58] Field of Search .................. 435/3, 172.1–172.3, 435/173.1, 173.5, 173.6, 173.8, 285.2, 285.1; 204/547, 643, 157.15, 450, 600, 663, DIG. 9; 205/341, 701, 744; 935/52, 85

[56] References Cited

U.S. PATENT DOCUMENTS

| | | | |
|---|---|---|---|
| 4,622,302 | 11/1986 | Sowers | 435/172.2 |
| 4,663,292 | 5/1987 | Wong et al. | 435/287 |
| 4,849,355 | 7/1989 | Wong | 435/172.3 |
| 4,946,793 | 8/1990 | Marshall, III | 435/291 |

FOREIGN PATENT DOCUMENTS

| | | |
|---|---|---|
| 1058043 | 1/1992 | China . |
| 1100463 | 3/1995 | China . |
| 63-283584 | 11/1988 | Japan . |
| 5-3788 | 1/1993 | Japan ............. 435/285.2 |

OTHER PUBLICATIONS

Scangos and Ruddle, "Mechanisms and applications of DNA–mediated gene transfer in mammalian cells—a review," 14 Gene 1 (1981), pp. 1–10.

W. Anderson, "Prospects for Human Gene Therapy," 226 Science 401 (Oct. 26, 1984), pp. 401–409.

T. Wong and E. Neumann, "Electric Field Mediated Gene Transfer," 107 Biochemical and Biophysical Research Communications 584 (Jul. 30, 1982), pp. 584–587.

*Primary Examiner*—William H. Beisner
*Attorney, Agent, or Firm*—Blakely, Sokoloff, Taylor & Zafman

[57] ABSTRACT

A computer system for controlling the parameters used during molecule transfer operations. The computer system includes a processor coupled to a memory. The memory stores instructions that are executed by the processor. The computer system controls the value of parameters that affect the characteristics of pulses delivered by a pulse generating circuit to a solution. The pulse generating unit delivers individual pulses during cycles. The cumulative pulse delivered during a specified number of cycles is a pulse output. The magnitude of a pulse output is determined by the number of cycles corresponding to the pulse output and the characteristics of the individual pulses delivered during the cycles. A pulse group is a series of pulse outputs. The computer system controls a molecule transfer operation by causing the pulse generation circuit to deliver one or more pulse groups to the solution. A user selects the shape and number of pulse groups to be delivered for an operation. The computer alters the operational parameters used by the pulse generation circuit to cause the pulse generation circuit to deliver pulse groups having the selected shapes.

8 Claims, 26 Drawing Sheets

A = Amplitude
Cy = Cycle
$T_A$ = Action Time = NP x Tp
$T_R$ = Relaxation Time
Np = Number of Pulses
Tp = Pulse (p) Time
$T_B$ = Burst Time = $T_A + T_R$
D = Distance between the anode and molecule-cell or cell-cell mixture

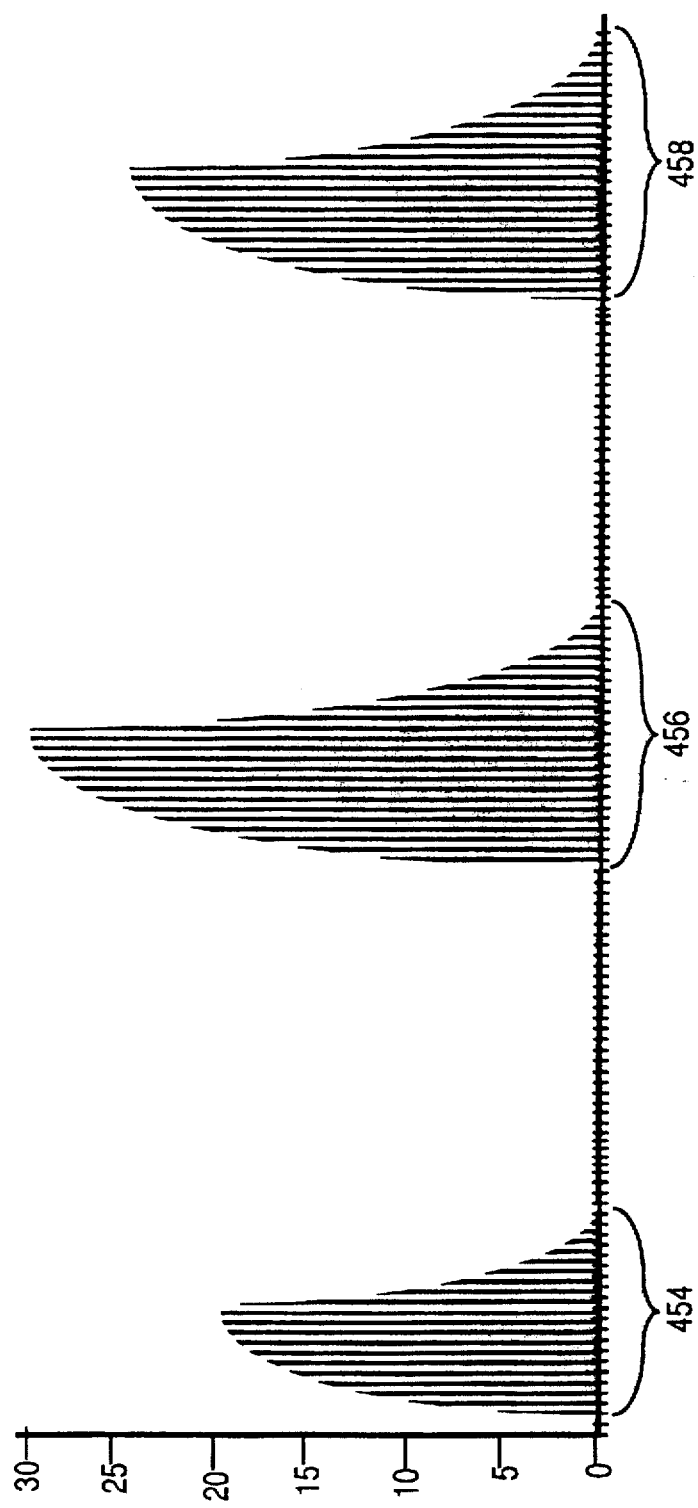

| Fig. 6a | Fig. 6b |
| Fig. 6c | Fig. 6d |
| Fig. 6e | Fig. 6f |

Fig. 6

COMPUTER SYSTEM FOR CONTROLLING VALUES OF OPERATIONAL PARAMETERS DURING AN OPERATION

FIELD OF THE INVENTION

This invention relates to computer systems and more particularly, to a computer control system for controlling the operative parameters in effect during molecule transfer operations.

BACKGROUND OF THE INVENTION

A high-voltage molecule transfer system based on the prior art is described in U.S. Pat. No. 4,663,292 issued to Wong et. al on May 5, 1987, the contents of which are incorporated herein by reference. The Wong system generates a high voltage discharge through a solution of cells and biological macromolecules to cause biological macromolecule transfers and cell fusions.

The Wong system has numerous controls for setting certain characteristics of the high-voltage discharge. Specifically, an amplitude control sets the amplitude of the high-voltage discharge. A burst time control sets the duration or burst time of the high-voltage discharge output. A cycle number control sets the number of cycles in the high voltage discharge output. A pulse control sets the number of pulses within each burst of the high voltage discharge output. The duration of the individual pulses may also be adjusted.

Once the values for these voltage discharge characteristics have been set, a master trigger switch is activated to produce a chain of continuously discharging high-voltage pulses into a solution or suspension of cells and biological macromolecules. These high-voltage pulses contain the characteristics of the parameters (amplitude, burst time, number of cycles, number of pulses and duration of individual pulses) which were selected. These parameters may be readjusted for each experiment but are fixed during a particular experiment. Moreover, there is no provision for automatically providing timed gaps between groups of pulses.

It has been discovered that the results of molecule transfer operations may be affected by varying the characteristics of pulses generated during an experiment. However, current molecule transfer systems do not provide a mechanism to vary the pulses during an experiment in a consistent, repeatable manner. Therefore, it is desirable to provide a mechanism for consistently and predictably varying one or more characteristics of an output pulse during molecule transfer and cell fusion operations.

SUMMARY OF THE INVENTION

According to an embodiment of the invention, an apparatus for performing a molecule transfer operation is provided. The apparatus includes a computer system, an electronic pulse generating circuit, and an electronic pulse delivery device.

The computer system includes a memory, a processor, and a bus. The memory contains a series of instructions for controlling a plurality of parameters. The processor executes the series of instructions. Execution of the series of instructions causes the processor to generate signals indicative of the plurality of parameters. The bus couples the processor to the memory.

The electronic pulse generating circuit is coupled to the computer system. The electronic pulse generating circuit receives the signals indicative of the plurality of parameters from the computer system. The electronic pulse generating circuit generates pulses having characteristics based on the plurality of parameters. The electronic pulse delivery device delivers the pulses to a solution.

According to one aspect of the invention, the electronic pulse generating circuit generates the pulses in cycles. The electronic pulse generating circuit generates a number of individual pulses in each cycle. The individual pulses have a pulse duration and a pulse amplitude. The series of instructions typically includes instructions for controlling the amplitude of the pulses, instructions for controlling the distance between the electronic pulse delivery device and the solution, instructions for controlling the duration of the cycles, instructions for setting the number of pulses, instructions for setting the pulse duration, and instructions for setting the pulse amplitude.

According to one aspect of the invention, a computer controlled method for performing a molecule transfer operation is provided. According to the method, a first pulse output is delivered to a solution. The first pulse output has a first magnitude determined by a plurality of operational parameters. A computer system modifies at least one of the plurality of operational parameters after delivering the first pulse output and prior to delivering a second pulse output. The second pulse output is then delivered to the solution. The second pulse output has a second magnitude determined by the plurality of operational parameters.

According to an aspect of the invention, the step of delivering the first pulse output may include the step of delivering a first series of individual pulses to the solution during a first series of cycles, where the first pulse output is the cumulative pulse of the first series of individual pulses. The step of delivering the second pulse output includes the step of delivering a second series of individual pulses to the solution during a second series of cycles, where the second pulse output is the cumulative pulse of the second series of individual pulses.

According to another aspect of the invention, the plurality of operational parameters may include a parameter which determines a number of individual pulses applied to the solution during a given cycle, a parameter which determines a number of cycles executed during delivery of pulse outputs, an amplitude of individual pulses applied to the solution, a parameter which determines a duration of individual pulses applied to the solution, and/or a parameter which determines a duration of cycles executed during delivery of pulse outputs.

According to another aspect of the invention, the steps of delivering the first pulse output and delivering the second pulse output are performed by a pulse delivery mechanism positioned at a distance from the solution. The pulse delivery mechanism may be, for example, an electrode. The plurality of operational parameters includes a parameter which determines the distance between the pulse delivery mechanism and the solution. Modifying the plurality of operational parameters causes the computer system to change the parameter which determines the distance between the pulse delivery mechanism and the solution.

According to another aspect of the invention, the method includes delivering a first pulse group and a second pulse group to the solution, where the first pulse output is a last pulse output in the first pulse group and the second pulse output is a first pulse output in the second pulse group. Thus, the step of causing the computer system to modify at least one of the plurality of operational parameters includes causing the computer system to modify the operational parameters after delivering the first pulse group and before delivering the second pulse group.

According to an alternative aspect of the invention, both the first pulse output and the second pulse output belong to a single pulse group. Thus, the step of causing the computer system to modify at least one of the plurality of operational parameters includes causing the computer system to modify the operational parameters during the delivery of the pulse group.

According to yet another aspect of the present invention, a method for performing a molecule transfer operation is provided. The method includes receiving input from a user indicating a selected pulse group shape, and delivering a pulse group having the selected pulse group shape to a solution. The pulse group is delivered to the solution by repeatedly performing the steps of (1) causing a computer system to set one or more parameters of a plurality of parameters based on the selected pulse group shape and (2) delivering a pulse output to the solution, where the pulse output has a magnitude determined by the plurality of parameters.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4i illustrates three pulse groups in which the magnitude of pulse outputs increases at a non-constant rate for the first half of pulse outputs in each pulse group, and decreases at a non-constant rate for the second half of pulse outputs in each pulse group;

FIG. 4k illustrates how pulse groups with differing shapes may be combined in a sequence to perform a cell transfer operation according to one aspect of the present invention; for FIGS. 4a–4k, the horizontal axis represents time and the vertical axis represents the magnitude as described for FIG. 3a.

FIG. 6 and FIGS. 6a through 6f illustrate one possible implementation of the bus connector shown in FIG. 5;

DETAILED DESCRIPTION OF THE PREFERRED EMBODIMENT

A method and apparatus for performing a computer-controlled high-voltage molecule transfer and cell fusion operation is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1A:
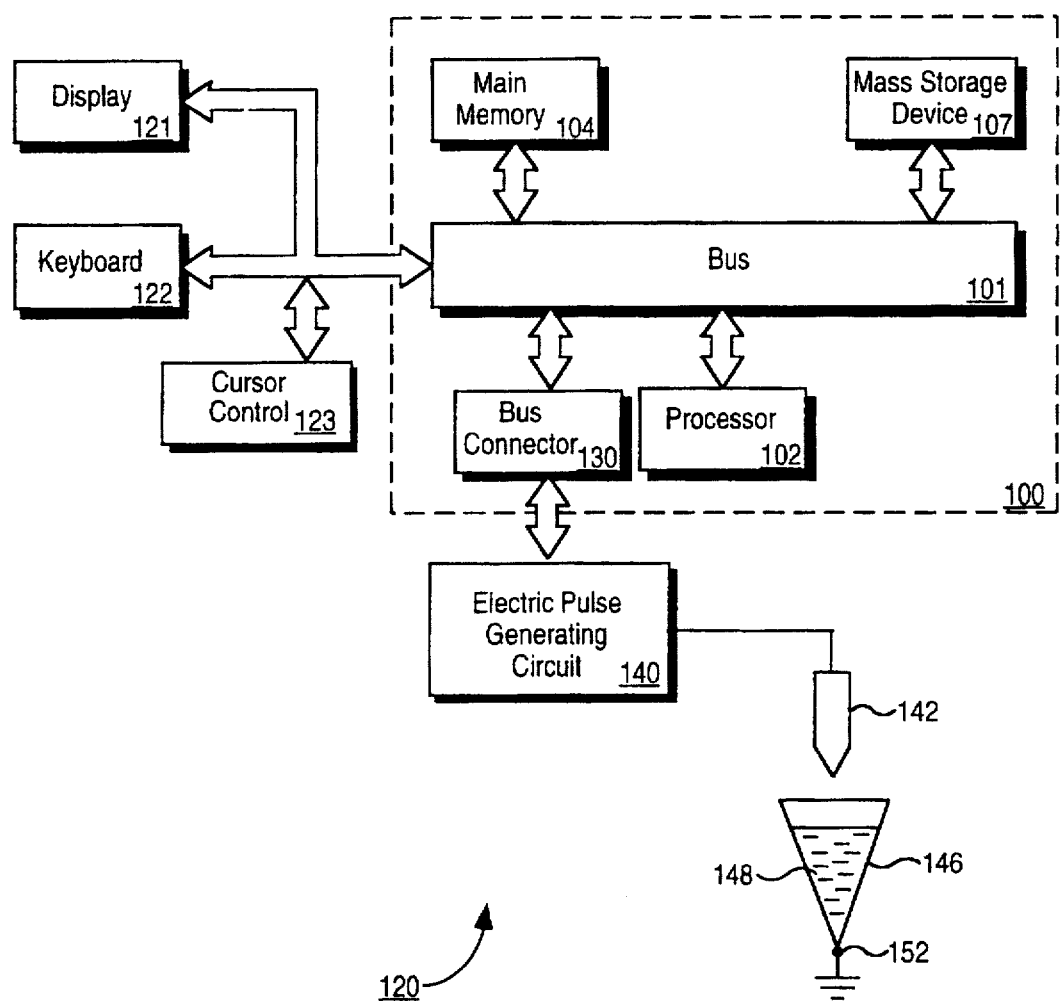
FIG. 1a illustrates a system which includes a computer system which may be used to implement an embodiment of the present invention.

Referring to FIG. 1, it illustrates a computer system 100 which may be used to implement the preferred embodiment of the present invention. Computer system 100 comprises a bus or other communication means 101 for communicating information, and a processor 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 may also comprise a read only memory (ROM) and/or other static storage device 106 coupled to bus 101 for storing static information and instructions for processor 102. Data storage device 107 is coupled to bus 101 for storing information and instructions.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques. Also, alternatively, the processor may be a portion of a semiconductor chip which is coupled to a memory on the chip by a bus also on the chip; in this embodiment, the memory stores the instructions for varying the pulses as described herein. An example of this implementation would use a microcontroller having on chip memory, with the microcontroller's processing ALU being the processor.

In the currently preferred embodiment, the present invention is related to the use of computer system 100 to control parameters during, in one embodiment, high-voltage biological macromolecule transfer operations. Therefore, computer system 100 is one component of a larger high-voltage molecule transfer system 120. In one embodiment, a biological molecule or a nonbiological molecule may be transferred into a cell using the present invention. This operation is refereed to as a molecule transfer operation.

Various techniques have been developed for transferring biological macromolecules such as genes into cells. Biological macromolecules are defined as those molecules which cannot be readily diffused through cell membranes, such as DNA, RNA, protein, etc. Some examples of gene transfers are described in G. Scangos and F. Ruddle, "Mechanisms and applications of DNA-mediated gene transfer in mammalian cells—a review," 14 Gene 1 (1981); and W. Anderson, "Prospects for Human Gene Therapy," 226 Science 401 (Oct. 26, 1984).

One method of transferring genes into cells uses electric field pulses. This method is based on the theory that electric pulses above a certain threshold field strength would induce alternation of cell membranes, resulting in the delivery of molecules into the cells. Such a method is described in T. Wong and E. Neumann, "Electric Field Mediated Gene Transfer," 107 Biochemical and Biophysical Research Communications 584 (Jul. 30, 1982).

Figure 1B:
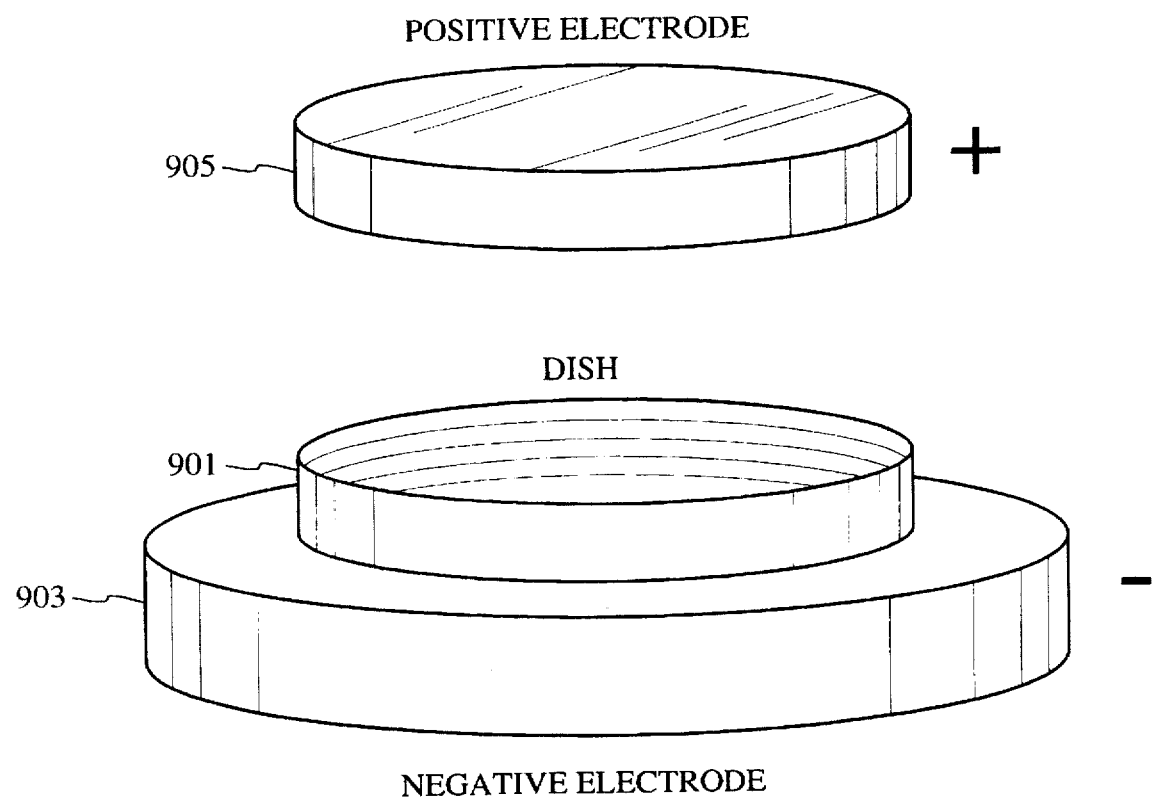
FIG. 1b shows an alternative embodiment of a reaction chamber.

High-voltage molecule transfer system 120 includes, in addition to computer system 100, an electronic pulse generating circuit 140, a probe or electrode 142 and a suspension receptacle 146. According to one embodiment, receptacle 146 is a hollow member having at one end a metallic grounding member 152. The grounding member 152, which is another electrode, may be, for example, a steel spherical electrode. According to an alternative embodiment an electronic pulse delivery (EPD) reaction chamber may be used and has in one embodiment, two, generally flat, electrodes which are both insulated electrically from the solution containing the cells and the macromolecules. These insulated electrodes create an electric field according to the voltages applied to the electrodes; because they are insulated from the solution, very low current flows through the solution. An example of a reaction chamber having these insulated electrodes is shown in FIG. 1b, in which electrodes 905 and 903 are disposed opposite each other with a dish 901 between the electrodes. The dish 901 contains the solution and cells and molecules which are to be transferred into the cells. This dish 901 in this embodiment of FIG. 1b replaces the receptacle 146 in the embodiment of FIG. 1a; similarly, the electrodes 903 and 905 of this embodiment replace the electrodes 142 and 152 of the embodiment shown in FIG. 1a. Various EPD reaction chambers are disclosed in U.S. patent application Ser. No. 08/337,862, entitled "Method and Apparatus for Gene Therapy", filed by Xi Zhao on Nov. 14, 1994, the contents of which are incorporated herein by reference.

Suspension receptacle 146 contains a solution or suspension 148 of cells and biological macromolecules such as DNA, RNA or proteins or smaller biological molecules or nombiological molecules. System 120 is operable without the necessity of immersing electrode 142 into suspension 148. Rather, electrode 142 is positioned above the top surface of suspension 148 in a noncontact fashion, e.g., 0.1 to 10 millimeters above the top surface. Typically, the solution is a pH buffered solution which includes the cells which are to be transformed and the macromolecules (e.g. DNA or RNA) which will be introduced into the cells according to a method of the invention. The solution is typically at a suitable, physiological pH and salinity.

Prior to performing a molecule transfer operation, receptacle 146 and grounding electrode 152 are preferably sterilized. Receptacle 146 is then filled with a suspension 148 of cells and, in one embodiment, biological macromolecules. Electrode 142 is positioned above the top surface of suspension 148 in a non-contact fashion. The distance between electrode 142 and the top surface of suspension 148, a distance D,-has an effect on the outcome of the experiment. For example, a small distance would enable the discharge of a greater amount of energy which in mm varies the membrane permeability of cells, permitting macromolecule transfers or cell fusions. The experimenter may vary this distance D to control the amount of discharging energy in order to optimize the efficiency of the biological macromolecule transfer or cell fusion. Various details concerning the transfer process are described in U.S. Pat. No. 4,849,355.

ELECTRONIC PULSE DELIVERY

During a molecule transfer operation, electrode 142 delivers high-voltage electronic pulses to suspension 148. In the alternative embodiment of FIG. 1b, the electrodes 903 and 905 deliver, through an electromagnetic field, pulses to the solution in the dish 901. It will be appreciated that reference in this description to electrode 142 is for purposes of illustration, and that electrodes 903 and 905, with dish 901, may also be used in accordance with the present invention. The pulses delivered by electrode 142 have certain characteristics that will be described hereafter with reference to FIG. 2. The characteristics of the pulses delivered during an operation affect the outcome of the operation.

Figure 2:
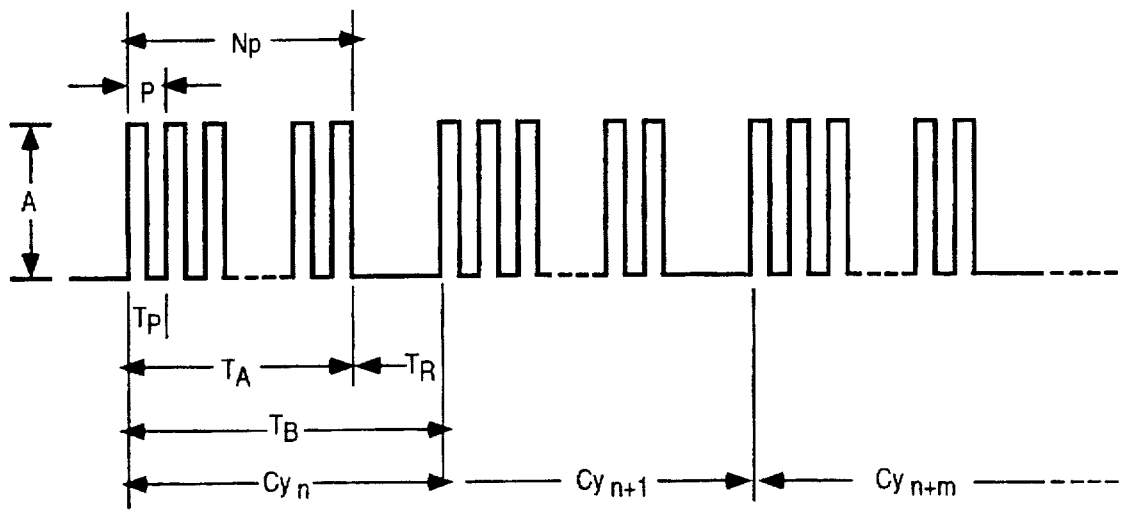
FIG. 2 illustrates various characteristics of the pulses delivered by an electrode to a solution during a cell transfer operation.
Figure 2:
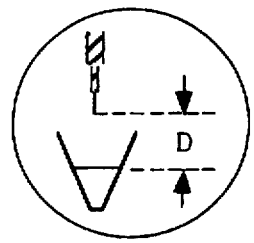

Referring to FIG. 2, it illustrates various characteristics of the pulses delivered by electrode 142 or electrodes 903 and 905 during an operation. Specifically, pulses are delivered in cycles (Cyn, Cyn+1, . . . Cyn+m). Within a given cycle, individual pulses (P) typically have a uniform amplitude (A) and a uniform duration or pulse time (Tp). The duty cycle of a pulse is typically fifty percent. Therefore, power is applied to electrode 142 during only one half of the pulse time. Alternatively, each pulse may have a varying amplitude or the pulses may be in the form of alternating current with the frequency being varied. In one embodiment of the present invention the amplitude may be up to 30 kilovolts and as few as about 100 volts.

A cycle has two components, an action time $(T_A)$ in which pulses are generated, and a relaxation time $(T_R)$ in which no pulses are generated. The action time of a cycle equals the pulse time of the individual pulses multiplied by the number of individual pulses (Np) generated during the cycle. For example, given a pulse duration of 62.5 microseconds, a cycle with 64 pulses will have an action time of 0.04 seconds. The length of the relaxation time of a cycle is equal to the duration or burst time of the cycle $(T_B)$ minus the duration of the action time.

PULSE OUTPUTS

A pulse output is the cumulative pulses delivered during one or more cycles. According to the invention, several pulse outputs are provided in sequence with timed gaps between the pulse outputs. The magnitude, in a broad sense, of a pulse output is the sum of the pulses generated during the cycles of the pulse output. Therefore, the magnitude of a pulse output is a function of the number of cycles (Nc) in the pulse output, the number of pulses within each cycle, the amplitude of the individual pulses in each cycle, the pulse time of the individual pulses in each cycle, the burst time of a cycle, and the distance between the electrode 142 and the suspension 148 during the delivery of the pulse output (or the distance between electrode 905 and disk 901). This relationship between the magnitude of a pulse output and the various parameters in effect during the delivery of the pulse output is illustrated by the expression:

PO=F(Nc, Np, A, Tp, $T_B$, D) where

PO is the magnitude of a pulse output,

Nc is the number of cycles in the pulse output,

Np is the number of pulses within each cycle,

A is the amplitude of the individual pulses in each cycle,

Tp is the pulse time of the individual pulses in each cycle, $T_B$ is the burst time of a cycle, and D is the distance between the electrode and the solution.

When the value of any one of the parameters (Nc, Np, A, Tp, $T_B$, D) changes, the magnitude of the pulse output changes.

PULSE GROUPS

Figure 3A:
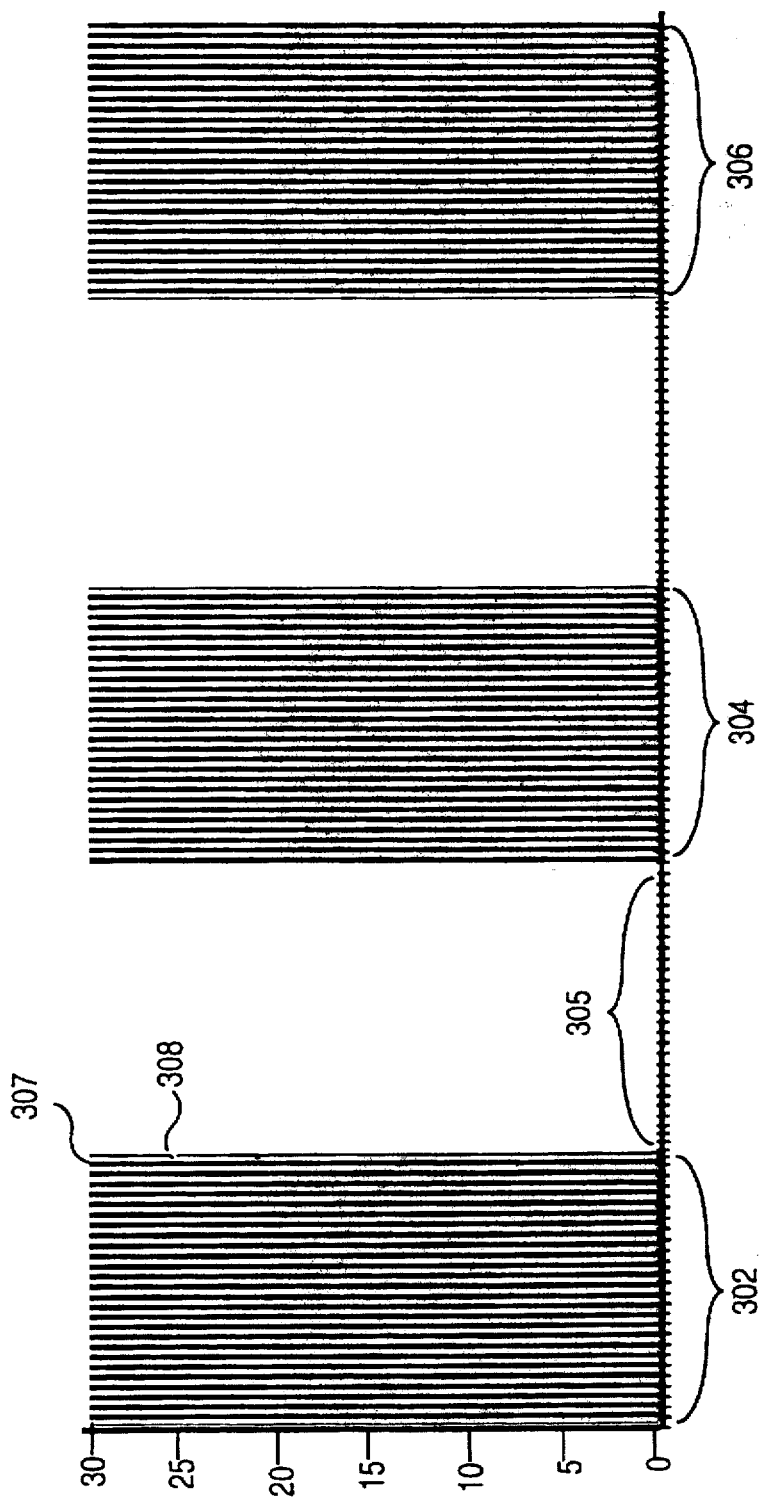
FIG. 3a is a graph illustrating a cell transfer operation that includes the delivery of three identical pulse groups separated by group gaps between the pulse groups.

A pulse group is a sequentially delivered series of pulse outputs. Typically a sequence of pulse groups will be delivered and typically, according to the invention, a timed delay (having no pulses) between the pulse groups will be provided. An example of this timed delay is shown in FIG. 3a as delay 305. The length of the delay between pulse groups may be varied also as a parameter. As explained above, the magnitude (PO) of each pulse output in a pulse group is determined by the operational parameters that are in effect at the time the pulse output is delivered. Thus, if the parameters (Nc, Np, A, Tp, $T_B$, D) remain constant during the delivery of a pulse group, then all of the pulse outputs in the pulse group will have the same magnitude. If one or more of the parameters is altered between the delivery of one pulse output and the next, then the pulse outputs will have different magnitudes.

The characteristics of a pulse group include the number of pulse outputs within the pulse group (PULSE-QUANTITY) and the shape of the pulse group (GROUP-SHAPE). As shall be illustrated hereafter, the shape of a pulse group is determined by variations in the magnitude of the pulse outputs within the pulse group.

MOLECULE TRANSFER OPERATIONS

Molecule transfer operations are performed by causing electrode 142 to deliver one or more pulse groups to the suspension 148 solution (or by causing electrodes 903 and 905 to deliver pulses of an electromagnetic field to the solution in the dish 901). FIG. 3a is a graph illustrating a molecule transfer operation that includes the delivery Of three pulse groups 302, 304 and 306. Each pulse group is represented by a plurality of lines. Each line, such as line 308, represents a pulse output or a cycle of pulses; that is, each line in FIG. 3a represents a cycle, such as cycle Cyn of FIG. 2, of pulses where there are Np pulses in a cycle.

In the graph, the x-axis represents time. Thus, in the illustrated operation, pulse group 302 is delivered before pulse group 304, and the cycle of pulses (a pulse output) represented by line 307 is delivered before the cycle of pulses (a pulse output) represented by line 308.

The y-axis of the graph represents magnitude. Consequently, the length of each line illustrates the magnitude of each of the pulses in the cycle of pulses represented by the line. For example, line 308 of pulse group 302 represents a pulse with a magnitude of 30. In one embodiment, a voltage of up to 30 kilovolts may be applied to the electrodes, such as electrodes 903 and 905.

In the operation represented in FIG. 3a, all three of the pulse groups have identical characteristics. Specifically, the magnitude of each line of each pulse output in each of the three pulse groups 302, 304 and 306 is constant. Consequently, all of the lines within each of the pulse groups have the same length. Therefore, the GROUP-SHAPE of pulse groups 302, 304 and 306 is identical. In addition, each of pulse groups 302, 304 and 306 have the same number of pulse outputs. Therefore, the PULSE-QUANTITY of pulse groups 302, 304 and 306 is identical.

In general, different reactions may be caused by changing the number of pulse groups (GROUP-QUANTITY) delivered during an operation and/or changing the characteristics (GROUP-SHAPE and PULSE-QUANTITY) of the pulse groups delivered during the operation. According to an embodiment of the present invention, a computer system is used to change the value of one or more operational parameters between the delivery of pulse groups or between the delivery of pulse outputs. As explained above, a change in the value of certain operational parameters will affect the magnitude of pulse outputs and the magnitude of the pulses during a cycle. Therefore, by changing the value of parameters between pulse groups or between pulse outputs in a single operation, operations that involve non-identical pulse groups or non-identical pulse outputs may be performed.

Figure 3B:
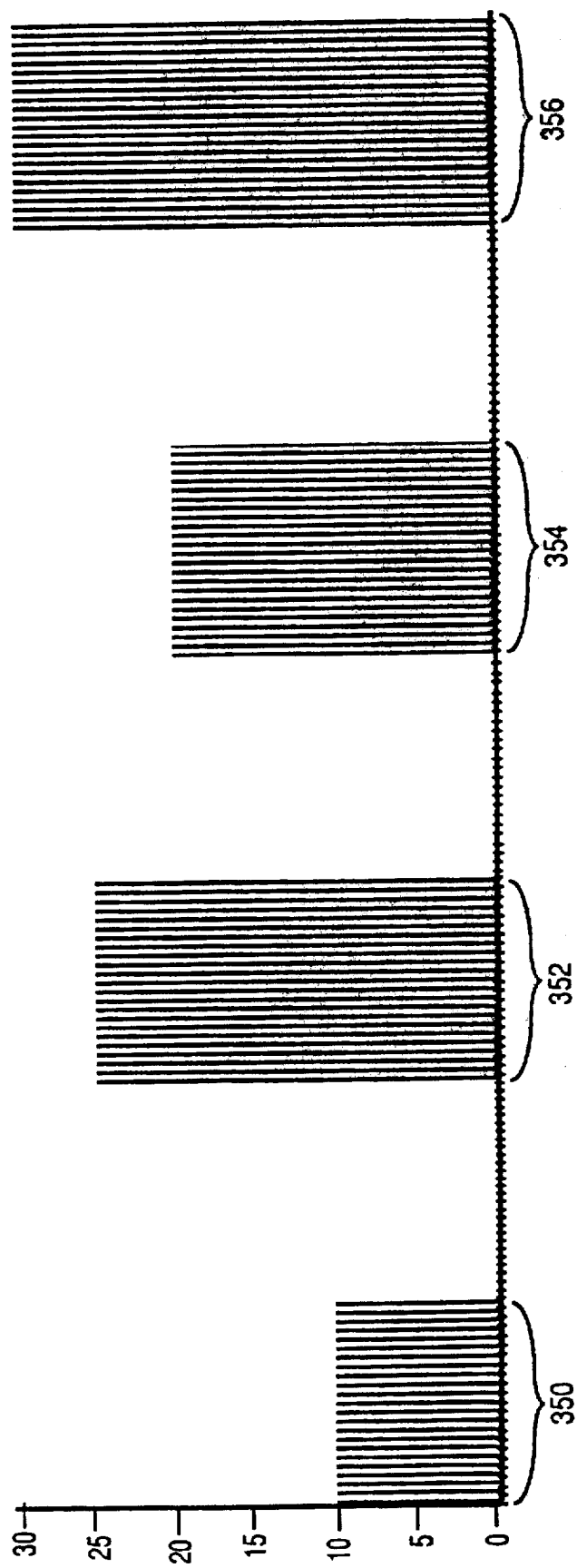
FIG. 3b illustrates a cell transfer operation which involves multiple pulse groups where the magnitude of pulse outputs remains constant within each of the pulse groups, but the magnitude of pulse outputs of each pulse group differs from the magnitude of pulse outputs of the other pulse groups.

FIG. 3b illustrates an operation which involves multiple pulse groups 350, 352, 354 and 356. Within each of the pulse groups, the magnitude of pulse outputs (PO) remains constant. However, the magnitude of pulse outputs of each pulse group differs from the magnitude of pulse outputs of the other pulse groups. The operation illustrated in FIG. 3b may be performed, for example, by causing a computer to change the value of the parameter that controls the amplitude of the individual pulses of each pulse group or the number of pulses per cycle (Np) between the delivery of each of the pulse groups.

PULSE OUTPUT MAGNITUDE VARIATION WITHIN A PULSE GROUP

As explained above, FIG. 3b illustrates an operation in which the magnitude of pulse outputs changes between pulse groups, but remains constant within each pulse group. According to another aspect of the invention, a computer system is used to alter the value of operation parameters during the delivery of pulse groups, as well as between the delivery of pulse groups.

Varying the value of operational parameters during the delivery of a pulse group results in pulse groups that contain pulse outputs of differing magnitudes. The pattern of variation in the magnitude of pulse outputs within a pulse group dictates the GROUP-SHAPE of the pulse group. FIGS. 4a to 4k illustrate various pulse groups that can be delivered by a molecule transfer system that uses a computer to modify parameter values during the delivery of pulse groups.

Figure 4A:
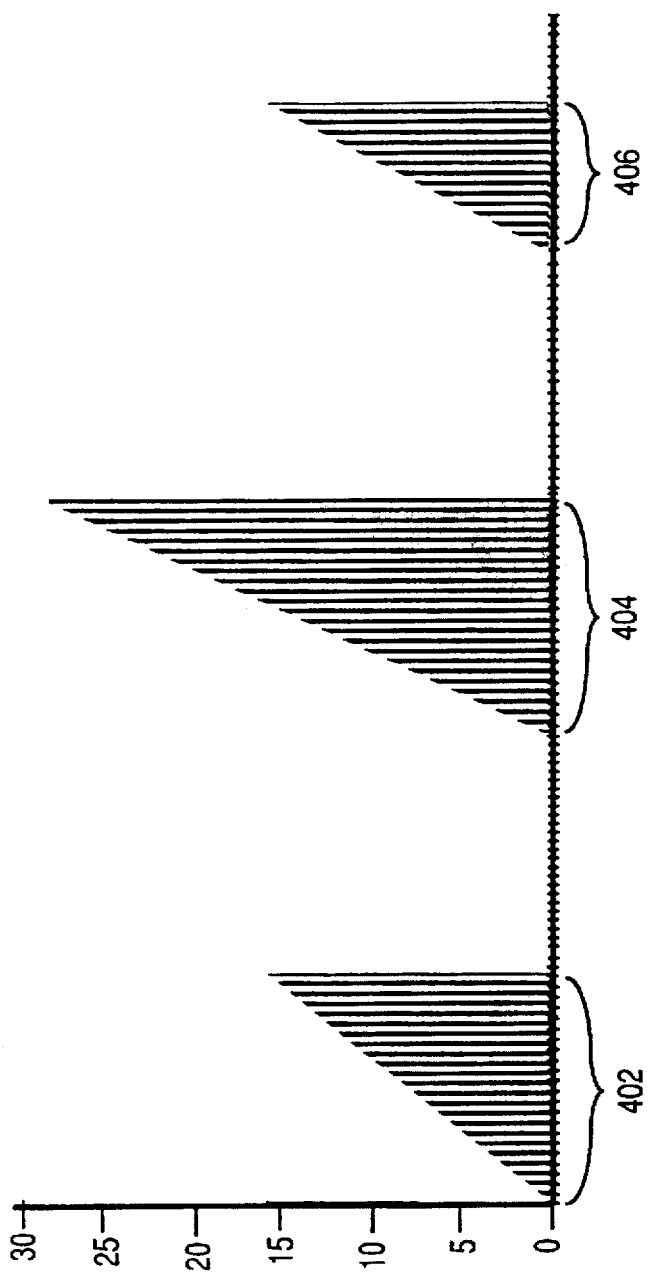
FIG. 4a is a graph of three pulse groups where each of the pulse groups represents a series of pulse outputs in which the magnitude of pulse outputs increases for each subsequent pulse output within a pulse group.

FIG. 4a is a graph of three pulse groups 402, 404 and 406. As with FIGS. 3a and 3b, each pulse group 402, 404 and 406 is represented by an array of lines. Each line represents a pulse output. The length of each line represents the magnitude of that pulse output represented by the line. In contrast to the pulse groups 302, 304 and 306 shown in FIG. 3a, the length of the lines in pulse groups 402, 404 and 406 varies over time. Specifically, each of pulse groups 402, 404 and 406 represents a series of pulse outputs in which the magnitude of pulse outputs increases for each subsequent pulse output within a pulse group. This may be achieved by, for example, increasing the amplitude of pulses within each new cycle of pulses within a pulse group. For example, pulses in the 8th cycle of pulses may each be at 5 kilovolts (Kv) and pulses in the 9th cycle of pulses may each be at 6 kilovolts. Alternatively, the pulses in the 8th cycle of pulses may steadily increase from 5 Kv to 6 kv and pulses in the 9th cycle may steadily increase from 6 Kv to 7 Kv. Due to the increasing magnitude of the pulse outputs, the outcome of an operation that delivers pulse groups 402, 404 and 406 may differ from the outcome of the operations represented in FIG. 3a and FIG. 3b.

While pulse groups 402, 404 and 406 are similar in that they all represent pulse groups in which the magnitude of pulse outputs increases over time, they differ from each other in other aspects. For example, the magnitude of the pulse outputs in pulse group 404 increases at a faster rate than the magnitude of the pulse outputs in pulse group 402. Therefore, pulse group 402 has a slightly different GROUP-SHAPE than pulse group 402. In contrast, the magnitude of the pulse outputs in pulse group 404 increases at the same rate as it does for pulse group 406, but the number of pulse outputs in pulse group 406 is less than the number of pulse outputs of pulse group 404. Thus, pulse groups 404 and 406 have the same GROUP-SHAPE, but have different PULSE-QUANTITIES. Each of these differences may affect the outcome of an operation. Thus, an operation in which a pulse group with one shape is delivered may yield different results than an operation in which a pulse group with a different shape is delivered, even if the shape of the two pulse groups have some characteristics in common.

Figure 4B:
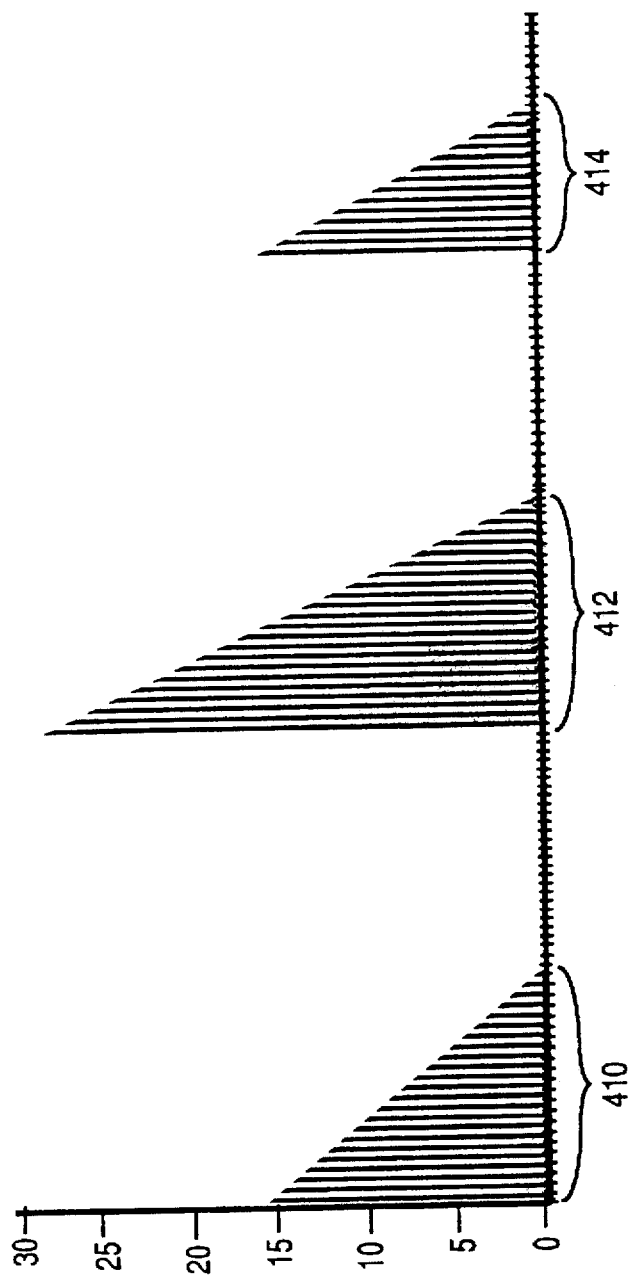
FIG. 4b illustrates three pulse groups in which the magnitude of pulse outputs decreases at a constant rate.

FIGS. 4b through 4k illustrate pulse groups that have a variety of shapes. Specifically, FIG. 4b illustrates three pulse groups 410, 412 and 414 in which the magnitude of pulse outputs decreases at a constant rate. The rate at which the magnitude of pulse outputs decreases is less for pulse group 410 than it is for pulse groups 412 and 414. Pulse group 414 has the same rate at which the magnitude of pulse outputs decreases as pulse group 412, but has a lower number of pulse outputs.

Figure 4C:
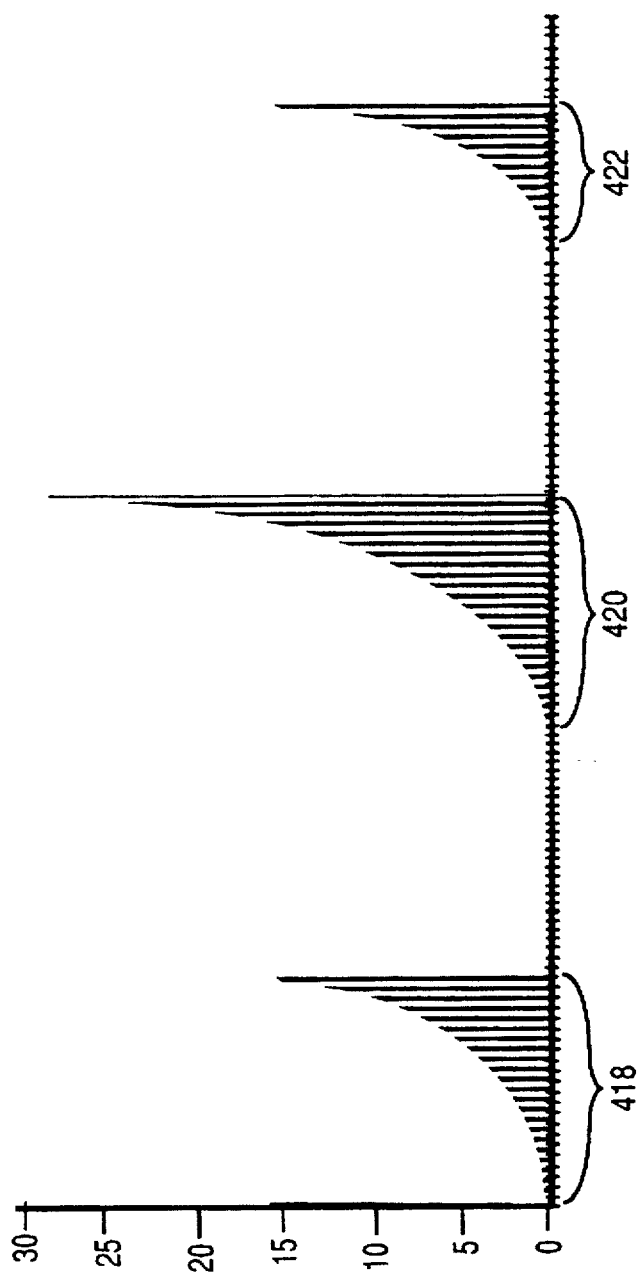
FIG. 4c illustrates three pulse groups in which the magnitude of pulse outputs increases at a non-constant rate.
Figure 4D:
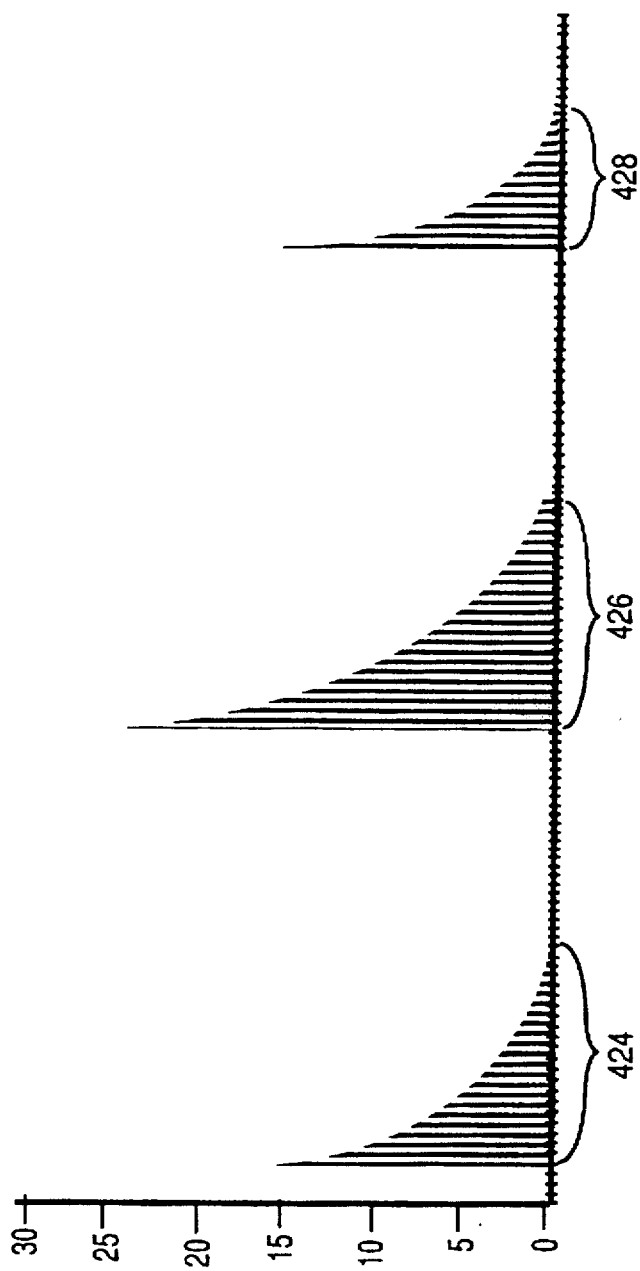
FIG. 4d illustrates three pulse groups in which the magnitude of pulse outputs decreases at a non-constant rate.

FIG. 4c illustrates three pulse groups 418, 420 and 422 in which the magnitude of pulse outputs increases at a non-constant rate. Pulse group 418 has a lower number of pulse outputs than pulse group 420 and a higher number of pulse outputs than pulse group 422. FIG. 4d illustrates three pulse groups 424, 426 and 428 in which the magnitude of pulse outputs decreases at a non-constant rate. Pulse group 424 has a lower number of pulse outputs than pulse group 426, and a higher number of pulse outputs than pulse group 428.

Figure 4E:
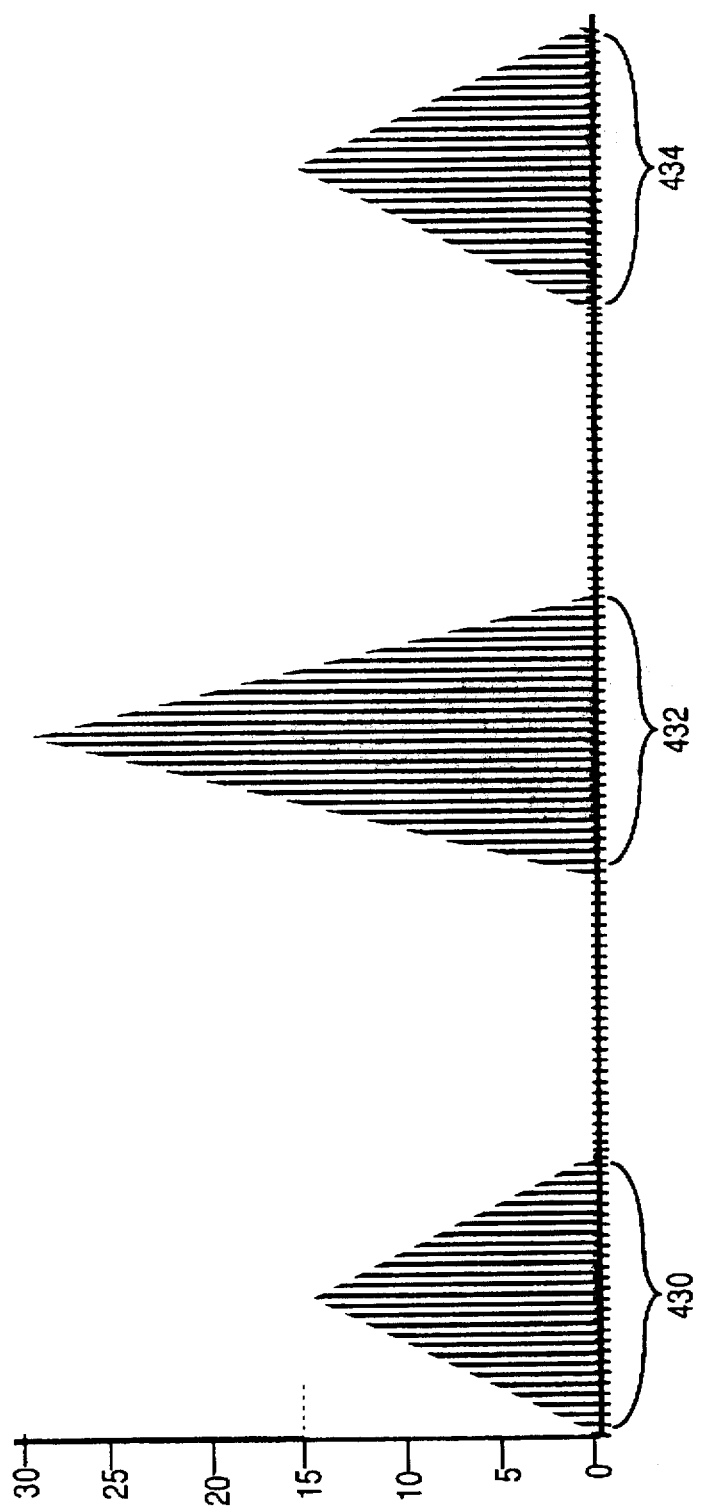
FIG. 4e illustrates three pulse groups in which the magnitude of pulse outputs increases at a constant rate for the first half of pulse outputs in each pulse group, and decreases at a constant rate for the second half of pulse outputs in each pulse group.

FIG. 4e illustrates three pulse groups 430, 432 and 434 in which the magnitude of pulse outputs increases at a constant rate for the first half of pulse outputs in each pulse group, and decreases at a constant rate for the second half of pulse outputs in each pulse group. Pulse group 432 has higher rates of magnitude of pulse outputs increases and decreases than pulse groups 430 and 434.

Figure 4F:
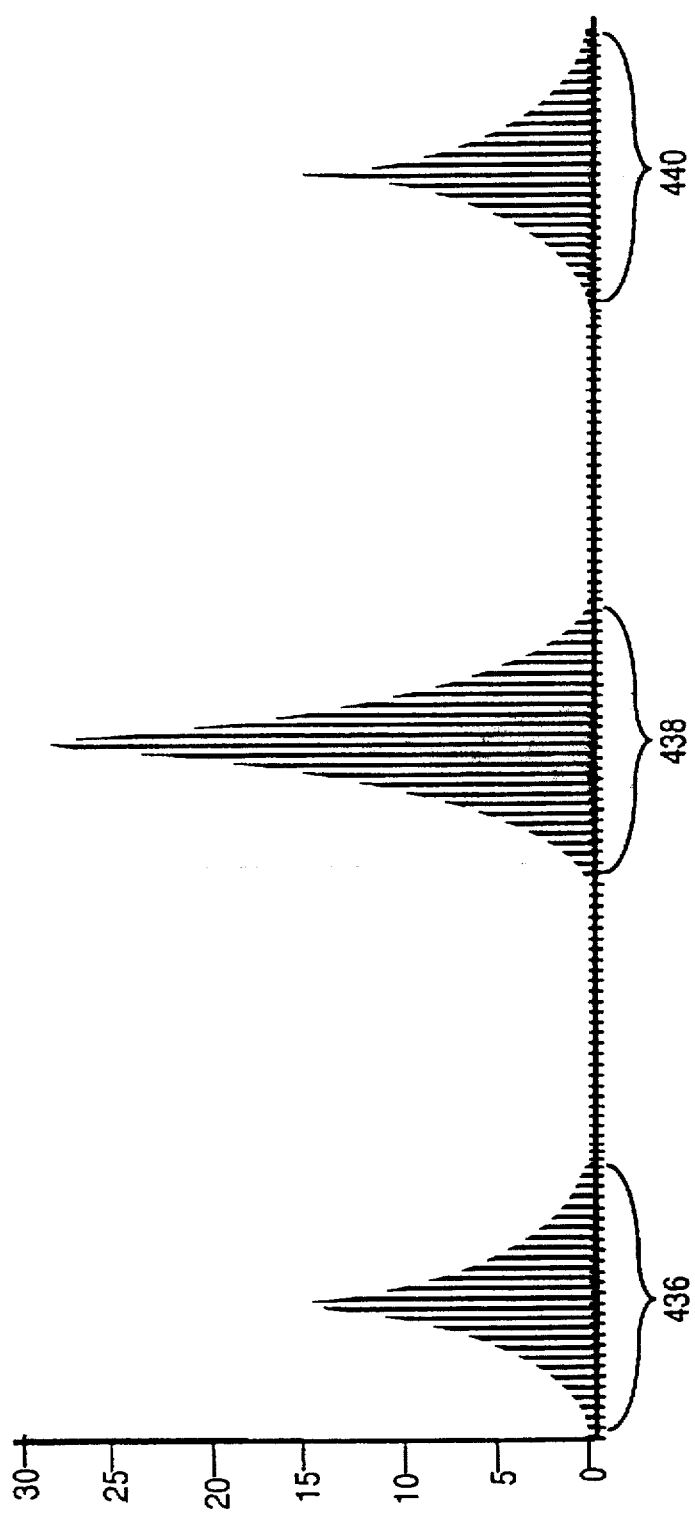
FIG. 4f illustrates three pulse groups in which the magnitude of pulse outputs increases at a non-constant rate for the first half of pulse outputs in each pulse group, and decreases at a non-constant rate for the second half of pulse outputs in each pulse group.

FIG. 4f illustrates three pulse groups 436, 438 and 440 in which the magnitude of pulse outputs increases at a non-constant rate for the first half of pulse outputs in each pulse group, and decreases at a non-constant rate for the second half of pulse outputs in each pulse group.

Figure 4G:
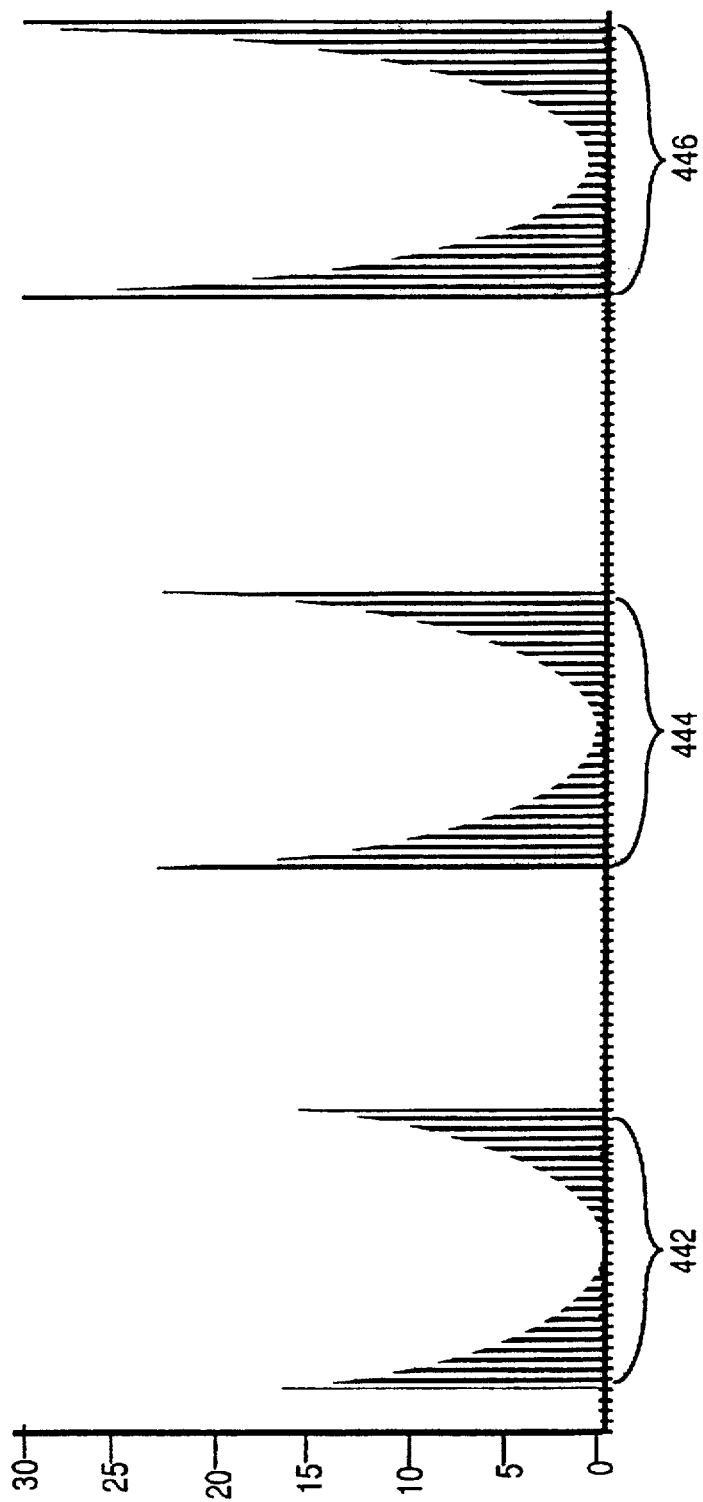
FIG. 4g illustrates three pulse groups in which the magnitude of pulse outputs decreases at a non-constant rate for the first half of pulse outputs in each pulse group, and increases at a non-constant rate for the second half of pulse outputs in each pulse group.

FIG. 4g illustrates three pulse groups 442, 444 and 446 in which the magnitude of pulse outputs decreases at a non-constant rate for the first half of pulse outputs in each pulse group, and increases at a non-constant rate for the second half of pulse outputs in each pulse group.

Figure 4H:
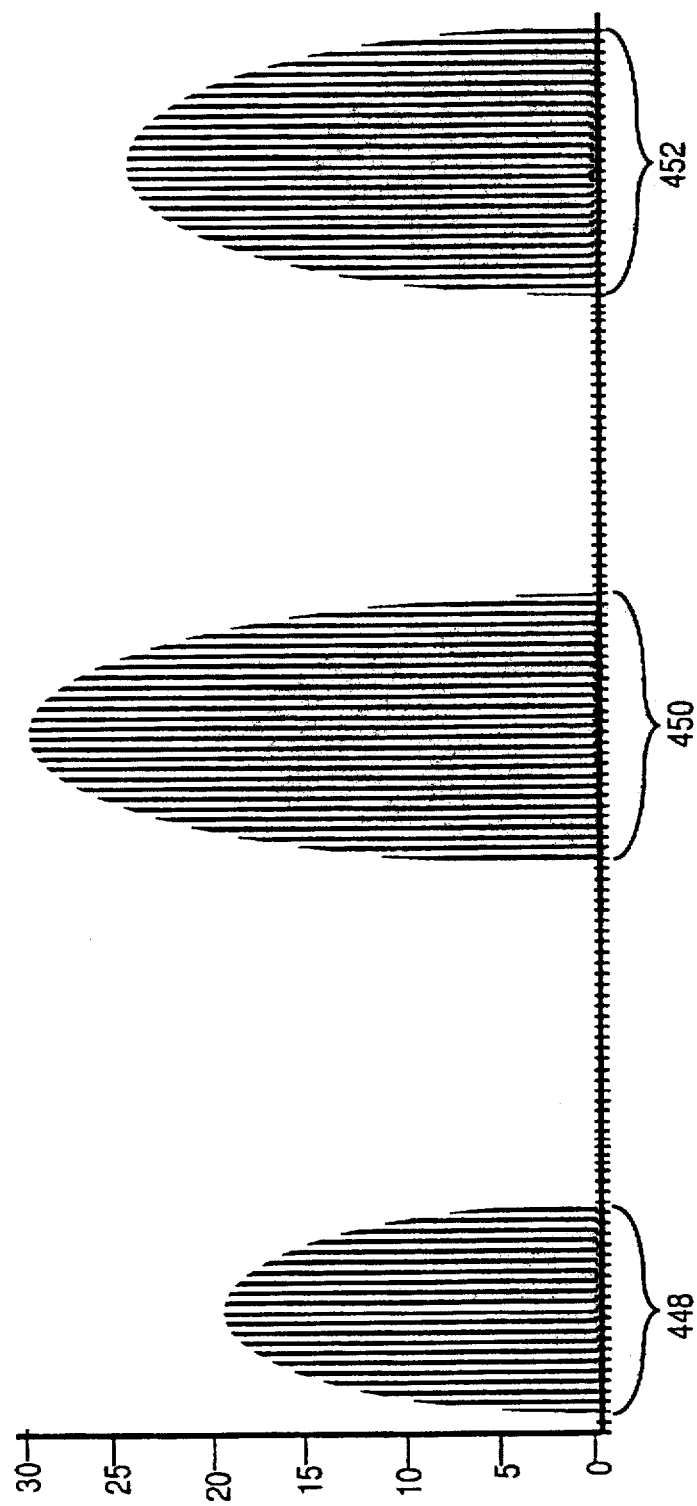
FIG. 4h illustrates three pulse groups in which the magnitude of pulse outputs increases at a non-constant rate for the first half of pulse outputs in each pulse group, anti decreases at a non-constant rate for the second half of pulse outputs in each pulse group.

Similar to the pulse groups illustrated in FIG. 4f, the magnitude of pulse outputs of the three pulse groups 448, 450 and 452 of FIG. 4h increases at a non-constant rate for the first half of pulse outputs in each pulse group, and decreases at a non-constant rate for the second half of pulse outputs in each pulse group. The difference between the overall shape of pulse groups 436, 438 and 440 of FIG. 4f and pulse groups 448, 450 and 452 of FIG. 4h is that the rate at which the magnitude of pulse outputs increases for the pulse groups of FIG. 4f increases over time, while the rate at which the magnitude of pulse outputs increases for the pulse groups of FIG. 4h decreases over time. Similarly, the rate at which the magnitude of pulse outputs decreases for the pulse groups of FIG. 4f decreases over time, while the rate at which the magnitude of pulse outputs decreases for the pulse groups of FIG. 4h increases over time. Pulse group 452 has a higher number of pulse outputs than pulse group 448.

Similar to the pulse groups illustrated in FIG. 4f and 4h, the magnitude of pulse outputs of the three pulse groups 454, 456 and 458 of FIG. 4i increases at a non-constant rate for the first half of pulse outputs in each pulse group, and decreases at a non-constant rate for the second half of pulse outputs in each pulse group. However, the rate at which the magnitude of pulse outputs increases for the pulse groups in FIG. 4i decreases over time, and the rate at which the magnitude of pulse outputs decreases for the pulse groups in FIG. 4i also decreases over time. Pulse group 454 has a lower number of pulse outputs than pulse group 456.

Figure 4J:
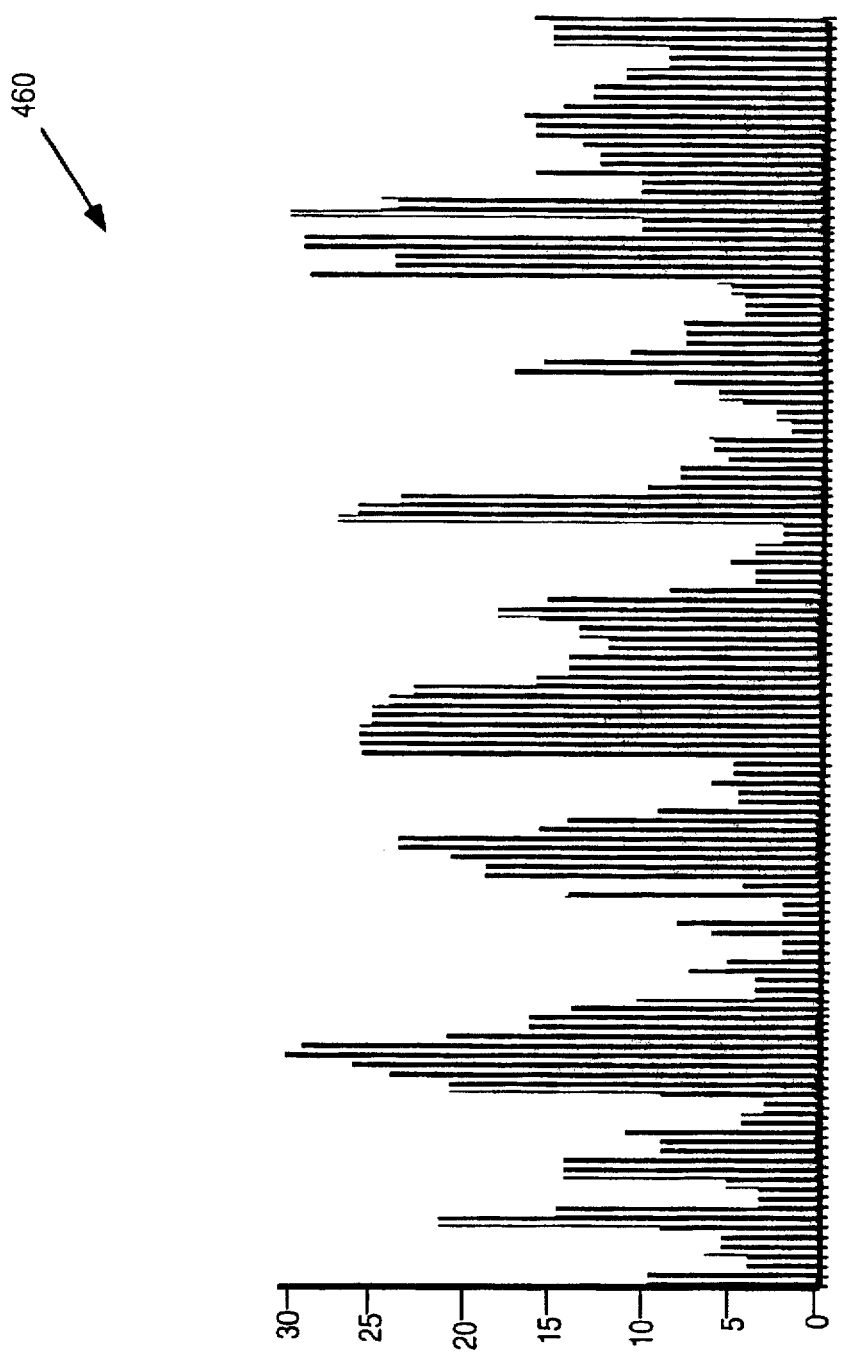
FIG. 4j illustrates a pulse group in which the magnitude of each pulse output is randomly determined.

FIG. 4j illustrates a pulse group 460 in which the magnitude of pulse outputs of each pulse output is randomly determined. Note that there are no timed delays between groups of pulse outputs.

Figure 4K:
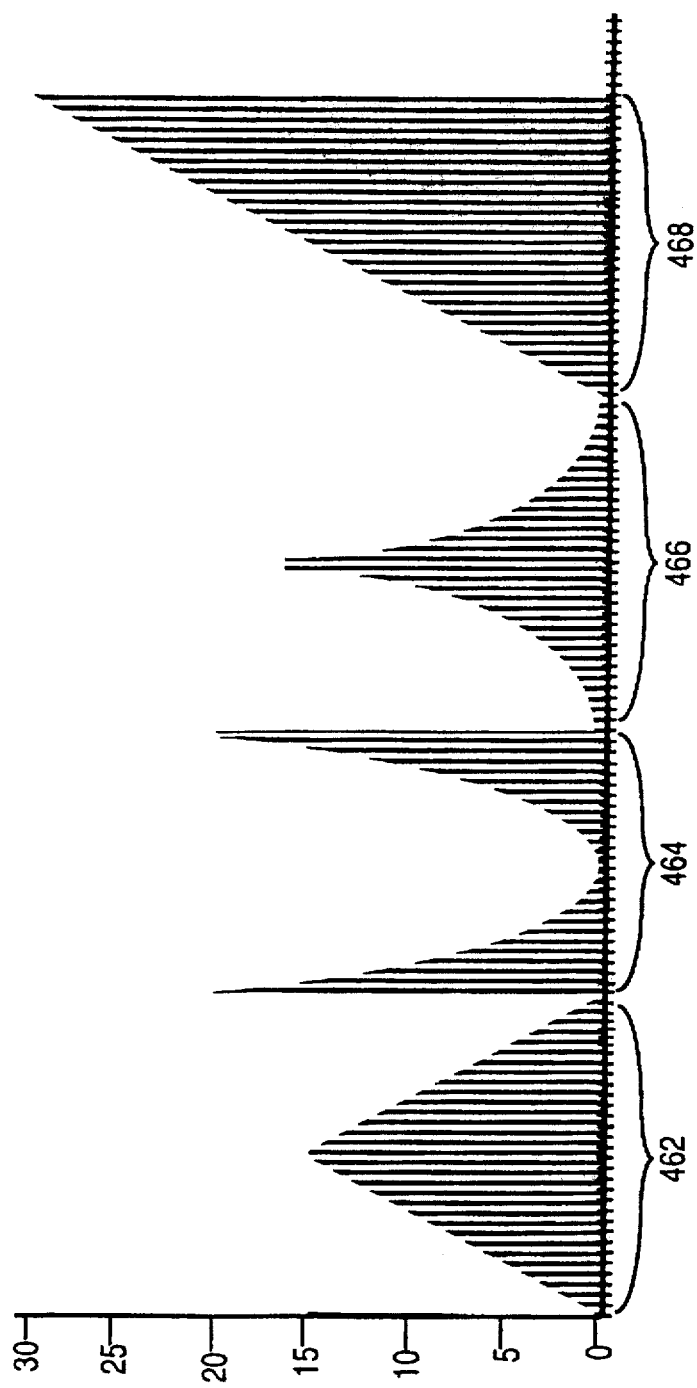

FIG. 4k illustrates how pulse groups with differing GROUP-SHAPES may be combined in a sequence to perform a molecule transfer operation. Specifically, the cell transfer operation illustrated in FIG. 4j involves four pulse groups 462, 464, 466 and 468 of pulse outputs. Each pulse group has a fundamentally different shape. The magnitude of pulse outputs of pulse group 462 increases at a constant rate for the first half of pulse outputs, and decreases at a constant rate for the second half of pulse outputs. The magnitude of pulse outputs of pulse group 464 decreases at a non-constant rate for the first half of pulse outputs, and decreases at a non-constant rate for the second half of pulse outputs. The magnitude of pulse outputs of pulse group 466 increases at a non-constant rate for the first half of pulse groups, and decreases at a non-constant rate for the second half of pulse outputs. The magnitude of pulse outputs of pulse group 468 increases at a constant rate.

AUTOMATED PARAMETER CONTROL

As explained above, the delivery of pulse groups with different characteristics will yield different molecule transfer results. However, in prior art systems, the parameters that affect the characteristics of pulse groups were determined by human-operated controls. Due to the timing required for the delivery of pulse groups, it was virtually impossible to alter the pulse group characteristics with any degree of accuracy. Consequently, operations typically involved the delivery of one group of cycles of identically-shaped pulses with no timed delays between groups of pulses.

To make possible the performance of accurate and repeatable operations that involve the delivery of non-identical pulse groups, the present invention controls the parameters that affect the magnitude of pulse outputs in pulse groups with a computer system. As was explained with reference to FIG. 1, the computer system 100 communicates with electronic pulse generating circuit 140 to cause electronic pulse generating circuit 140 to perform specified cell transfer operations having a specified number of pulse groups, where each pulse group has a specified shape and a specified number of pulse outputs. One embodiment of the system used to perform such operations shall now be described in greater detail with reference to FIG. 5.

Figure 5:
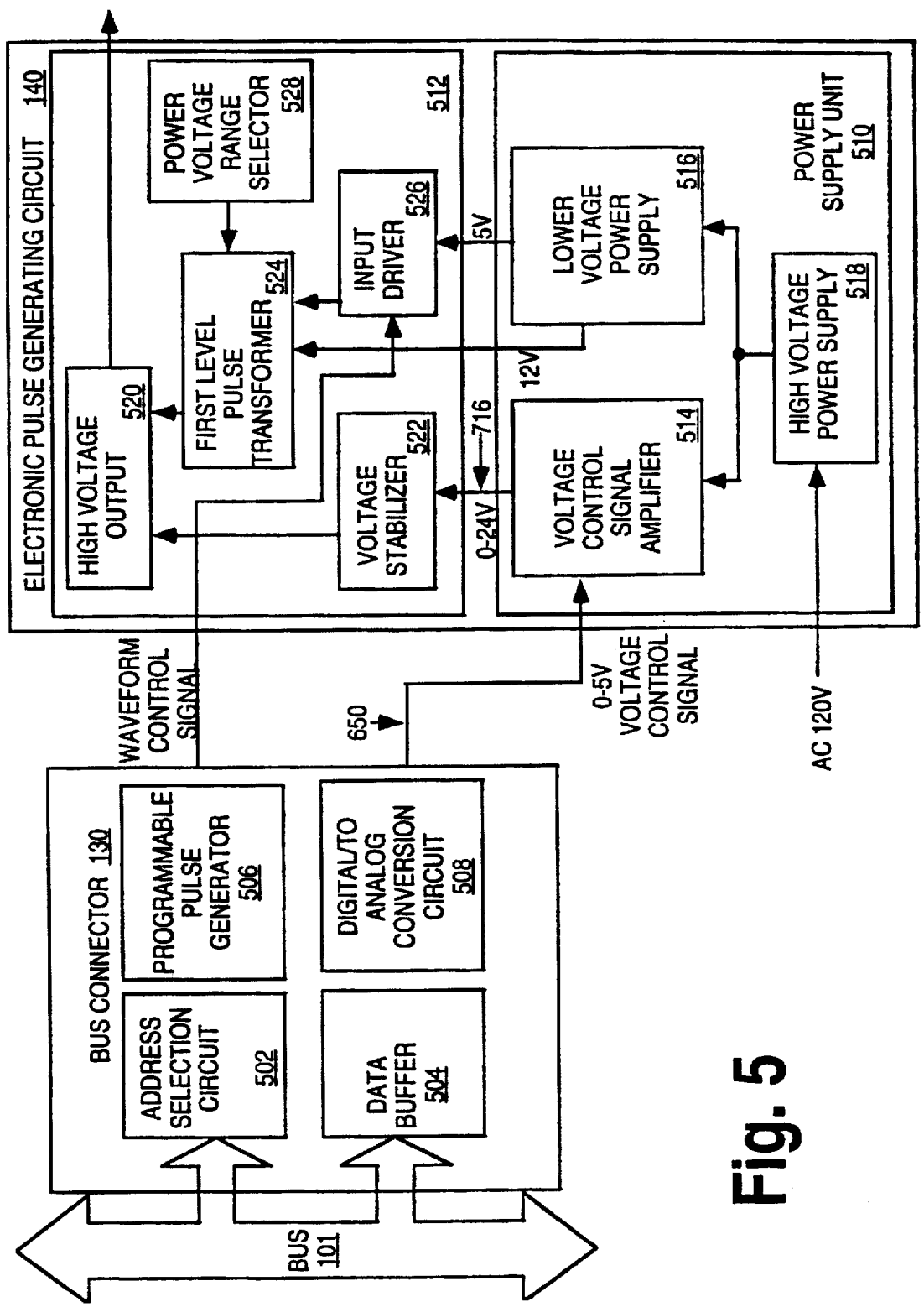
FIG. 5 illustrates the bus connector and electronic pulse generating circuit shown in FIG. 1 in greater detail according to one embodiment of the invention.
Figure 6A:
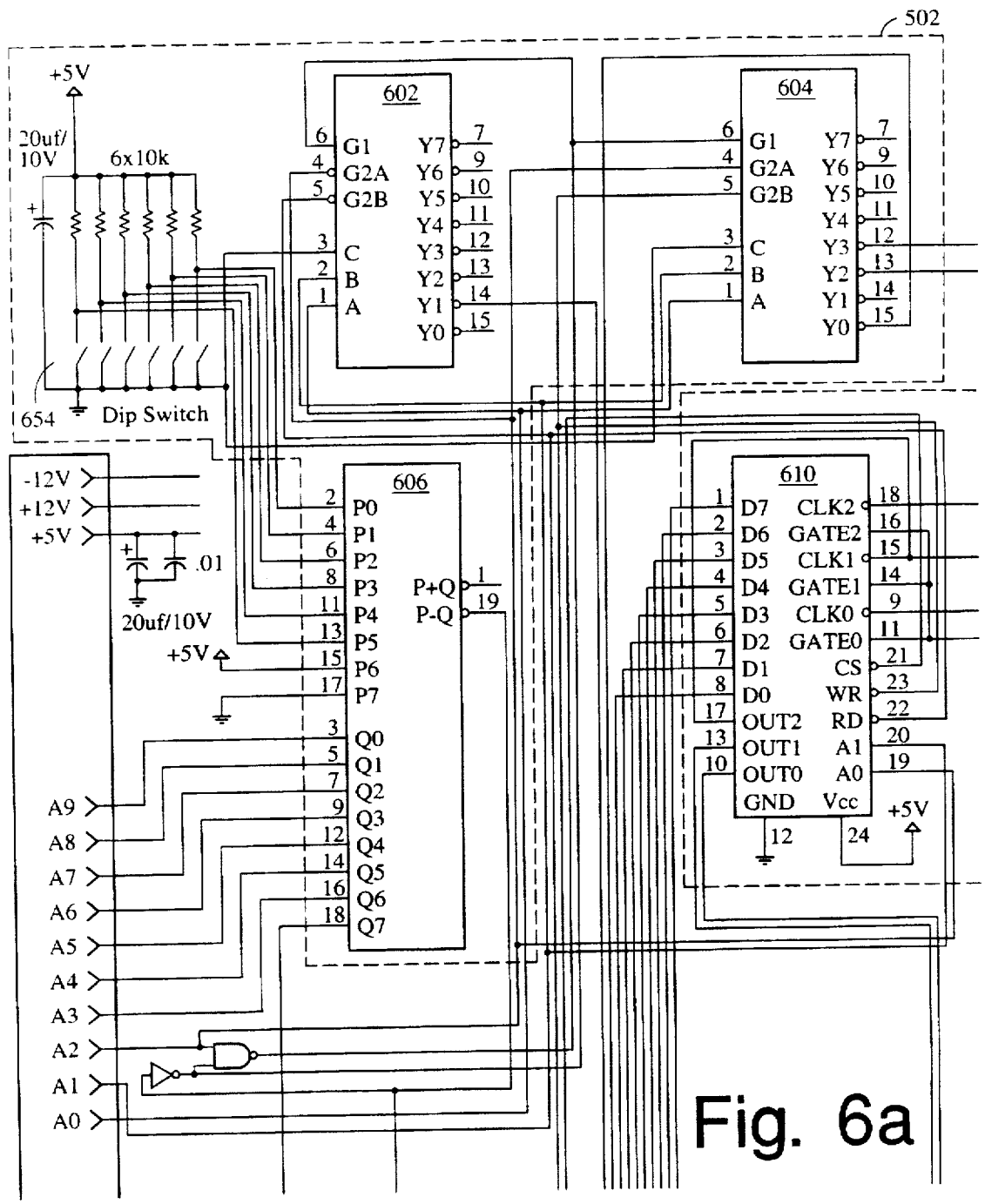
Figure 6B:
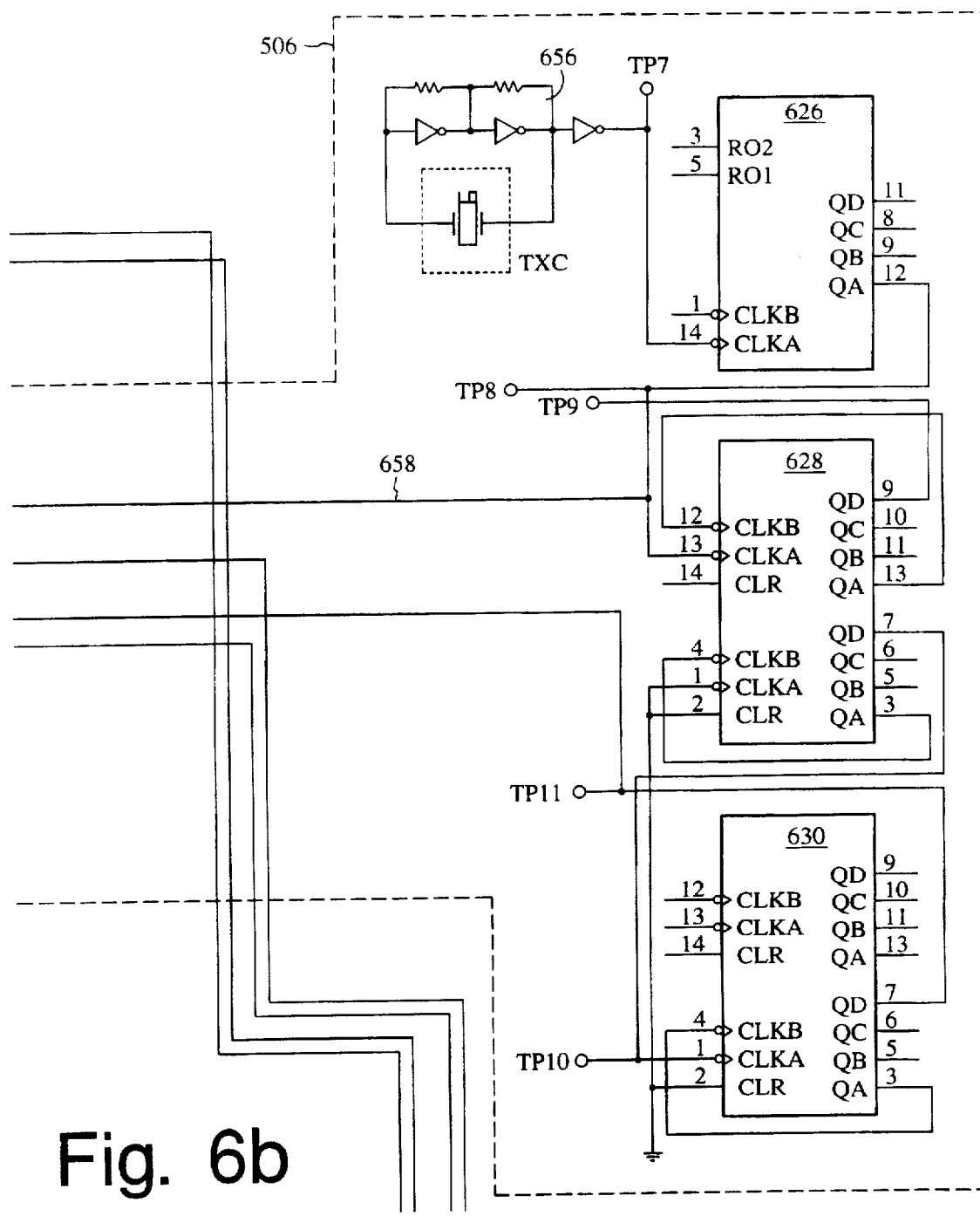
Figure 6C:
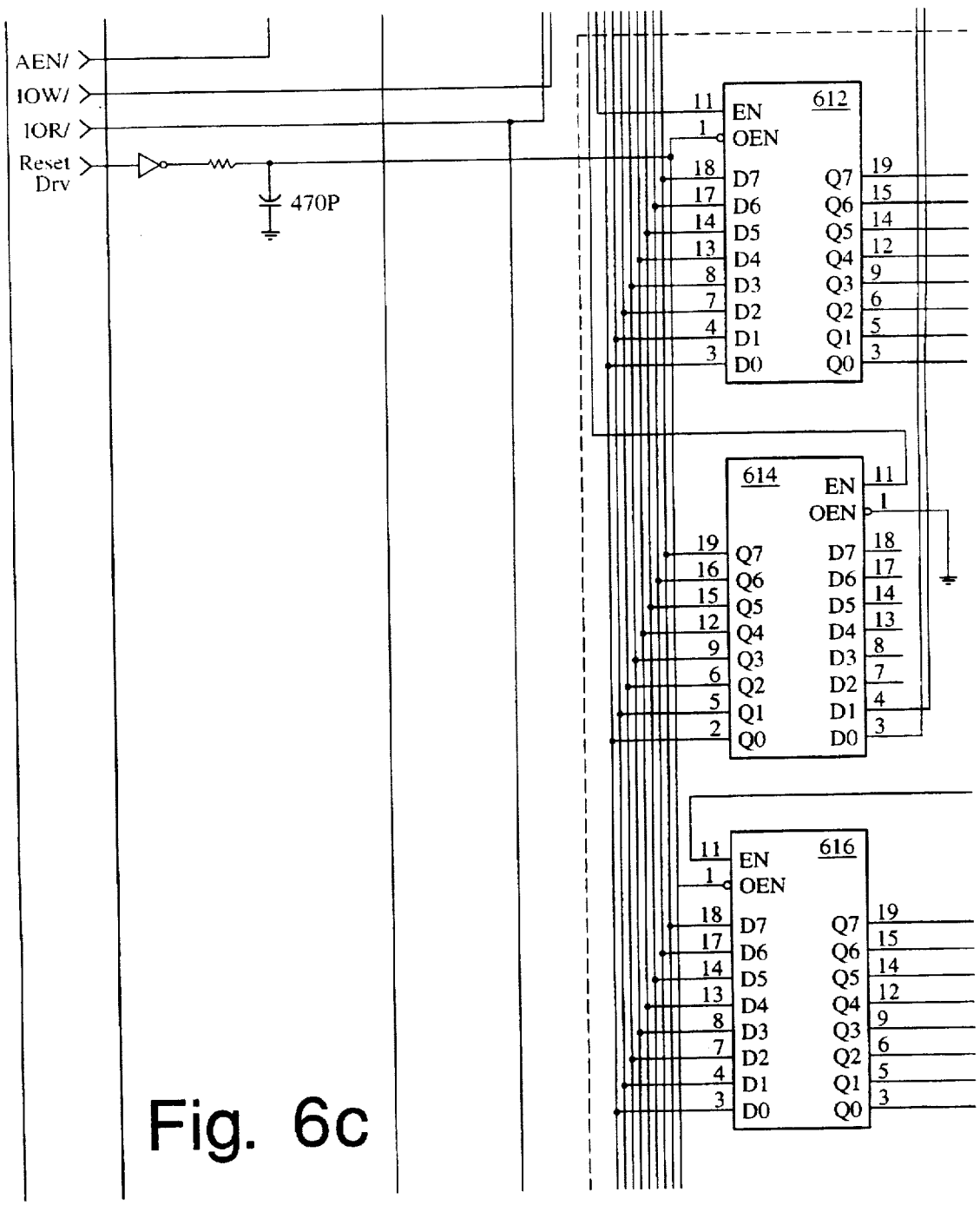
Figure 6D:
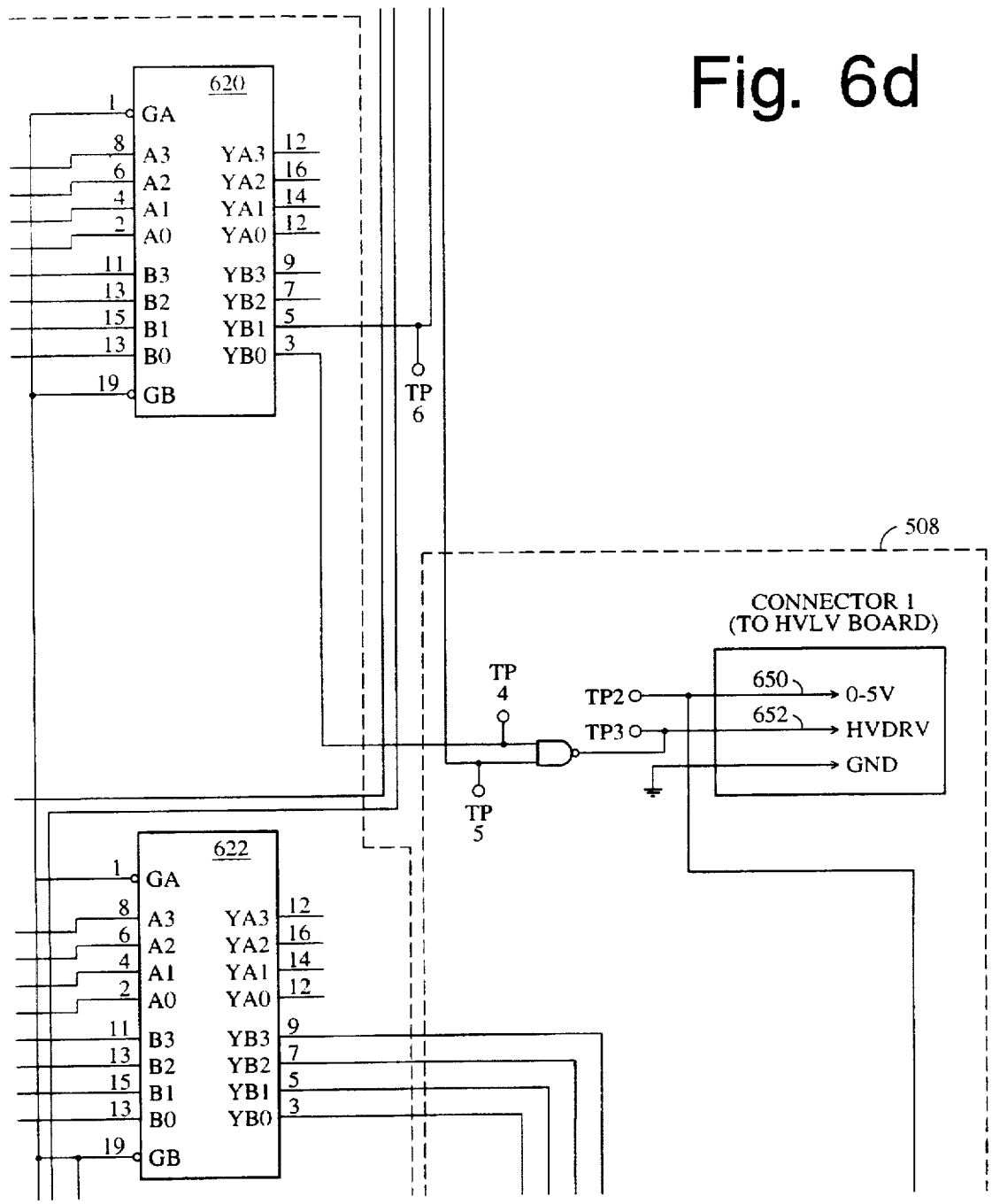
Figure 6E:
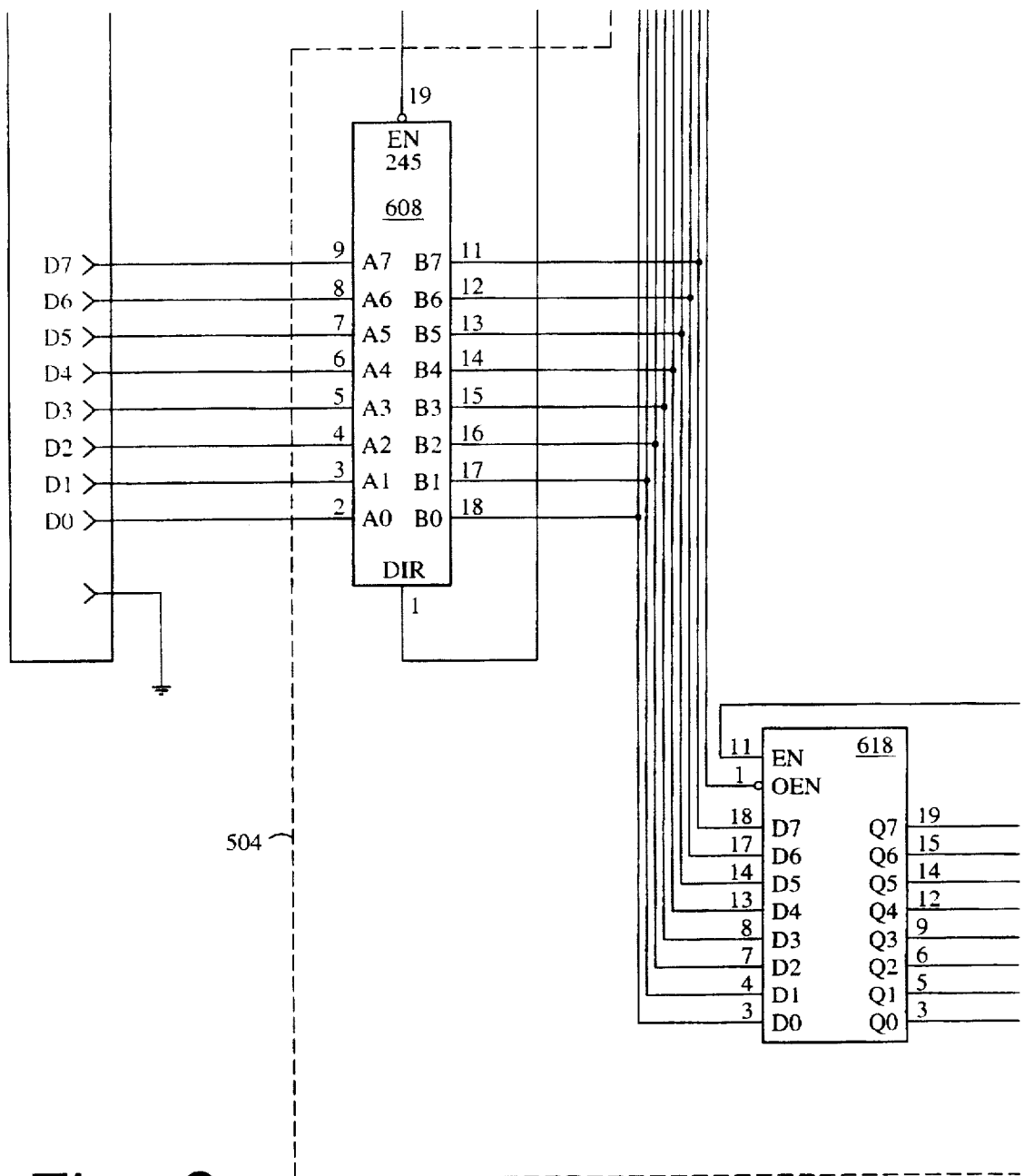
Figure 6F:
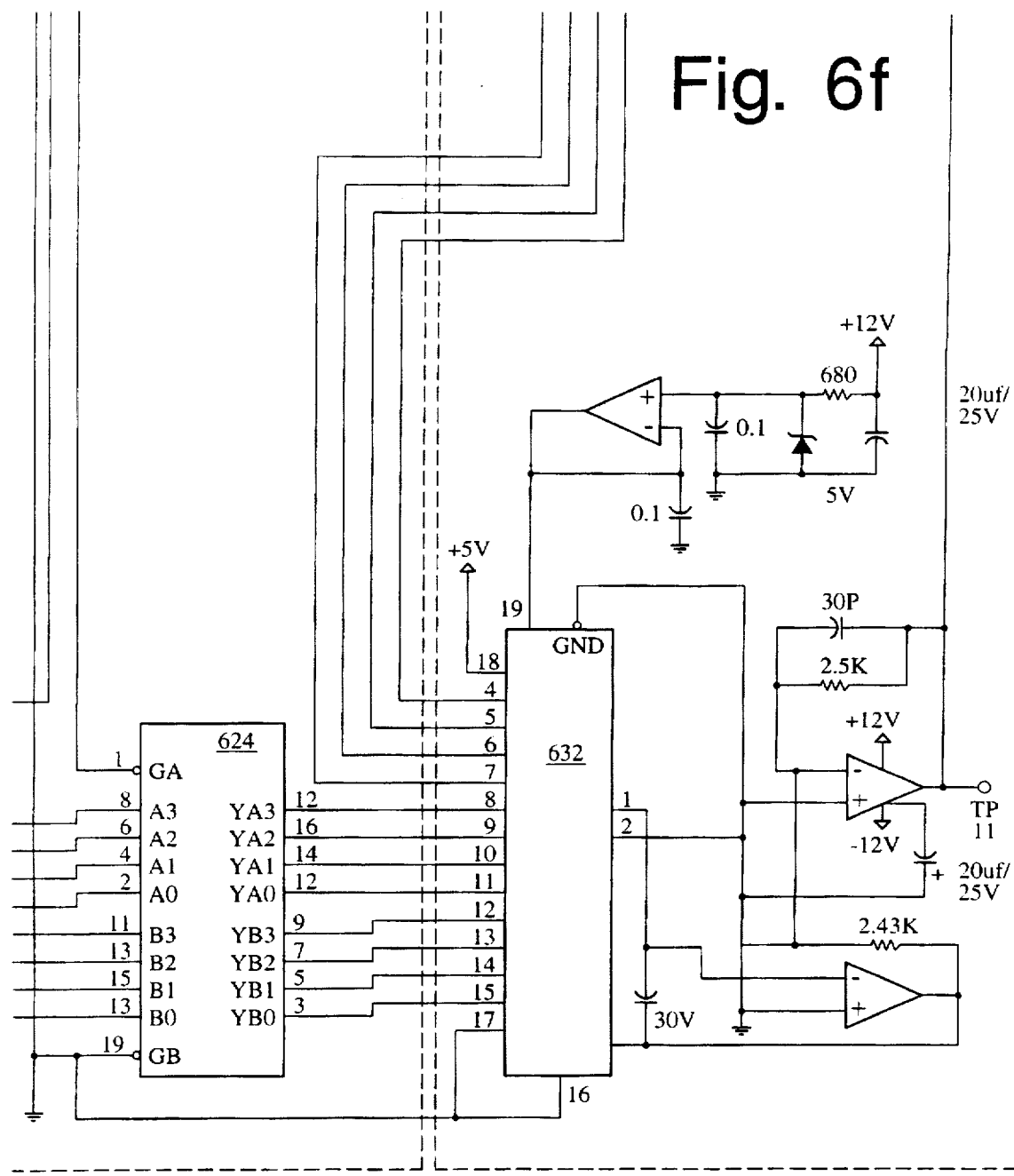

Referring to FIG. 5, it illustrates bus connector 130 and electronic pulse generating circuit 140 in greater detail. Bus connector 130 is connected to bus 101 through which it receives control information from processor 102. Such control information includes data indicating the values for parameters that affect the magnitude and timing of pulse outputs delivered by electronic pulse generating circuit 140.

BUS CONNECTOR

Bus connector generally includes an address selection circuit 502, a data buffer 504, a programmable pulse generator 506, and a digital-to-analog conversion circuit 508. Address selection circuit 502 allows a user to specify an address. Computer system 100 controls electronic pulse generating circuit 140 by sending control information to the selected address over bus 101. Data buffer 504 temporarily stores the control information received from computer system 100 over bus 101.

Programmable pulse generator 506 generates a waveform control signal based on control information received over bus 101. The waveform control signal is used to control the waveform of the pulses generated by electronic pulse generating circuit 140. Such a pulse, having a duration Tp, is generated using an oscillating circuit and a programmable counter. In a preferred embodiment, Tp is fixed at 62.5 microseconds. This duration is merely exemplary, and the present invention is not limited to that value.

The resultant waveform control signal that appears at the output of programmable pulse generator 506 is a signal that specifies the characteristics of parameters $T_B$, Cy, Np, Tp, and the group number (e.g. group 302 versus group 304), the timed delay gap between groups (e.g. the time of delay for delay 305), and the group shape. These parameters were produced by programmable pulse generator 506 based on the control data received from computer system 100.

Digital-to-analog conversion circuit 508 generates an analog voltage control signal based on control information received from computer system 100. The voltage control signal is sent to electronic pulse generating circuit 140 and controls the voltage of the signal generated by electronic pulse generating circuit 140. In one embodiment, bus connector 130 may be implemented as shown in FIG. 6 where the illustrated computer chips may be the items identified in Table 1.

TABLE 1

| | |
|---|---|
| Circuit 602 | Part number 74LS138 generally available from National Semiconductor Corporation. |
| Circuit 604 | Part number 74LS138 generally available from National Semiconductor Corporation. |
| Circuit 606 | Part number 74LS682 generally available from National Semiconductor Corporation. |
| Circuit 608 | Part number 74LS245 generally available from National Semiconductor Corporation. |
| Circuit 610 | Part number Intel 8253 generally available from Intel. |
| Circuit 612 | Part number 74LS273 generally available from National Semiconductor Corporation. |
| Circuit 614 | Part number 74LS373 generally available from National Semiconductor Corporation. |
| Circuit 616 | Part number 74LS273 generally available from National Semiconductor Corporation. |
| Circuit 618 | Part number 74LS273 generally available from National Semiconductor Corporation. |
| Circuit 620 | Part number 74LS244 generally available from National Semiconductor Corporation. |
| Circuit 622 | Part number 74LS244 generally available from National Semiconductor Corporation. |
| Circuit 624 | Part number 74LS244 generally available from National Semiconductor Corporation. |
| Circuit 626 | Part number 74LS93 generally available from National Semiconductor Corporation. |
| Circuit 628 | Part number 74LS390 generally available from National Semiconductor Corporation. |
| Circuit 630 | Part number 74LS390 generally available from National Semiconductor Corporation. |
| Circuit 632 | Part number AD7545 generally available from National Semiconductor Corporation. |

Referring to FIG. 6, address selection circuit 502 includes a plurality of switches 654 for specifying an address. The control signals on bus 101 that are sent to the address specified by switches 654 are latched into data buffer 504. Data buffer 504 includes a circuit 608 that latches the control signals into buffers provided by circuits 612, 614, 616, 618, 620, 622 and 624. The control signals specify parameters for a waveform control signal generated by programmable pulse generator 506 and for a voltage control signal generated by digital-to-analog conversion circuit 508.

Programmable pulse generator 506 includes an oscillator circuit 656 for generating an oscillating signal. Circuits 626, 628 and 630 transmit a clock signal at a predetermined frequency based on the oscillating signal. The clock signal is sent to a programmable counter 610 over line 658. The clock signal drives programmable counter 610 to generate a waveform control signal that is ultimately output on line 652.

The characteristics of the waveform control signal generated by programmable counter 610 are determined by how programmable counter 610 is currently programmed. Programmable counter 610 is programmed by control signals from bus 101 that are sent through latch circuit 608 to the data inputs of programmable counter 610. These control signals are initiated by the processor 102 of computer system 100 while executing software designed to drive electric pulse generating circuit 140.

Digital-to-analog conversion circuit 508 receives a control signal on the data inputs of circuit 632 and generates an analog signal on line 650 with a voltage that corresponds to the value of the digital control signal. As shall be explained hereafter, the voltage of the signal generated by digital-to-analog conversion circuit 508 ultimately determines the voltage (or amplitude A) of the pulses discharged by electrode 142 or electrodes 903 and 905. Therefore, the signal produced by digital-to-analog conversion circuit 508 on line 650 is hereafter referred to as the voltage control signal.

POWER SUPPLY UNIT

Referring again to FIG. 5, electronic pulse generating circuit 140 includes a power supply unit 510 and a pulse generating unit 512. Power supply unit 510 includes a voltage control signal amplifier 514, a lower voltage power supply 516 and a high voltage power supply 518. High voltage power supply 518 converts a high voltage alternating current to a high voltage direct current. In an implemented embodiment of the invention, high voltage power supply 518 converts a standard 120 V alternating current to a 27 V direct current. Lower voltage power supply unit 516 receives the high voltage DC signal from the high voltage power supply 518 and converts the signal to produce signals with lower voltages. In an implemented embodiment, lower voltage power supply 516 produces a 5 V signal and a 12 V signal based on the 27 V signal produced by high voltage power supply 518.

Figure 7:
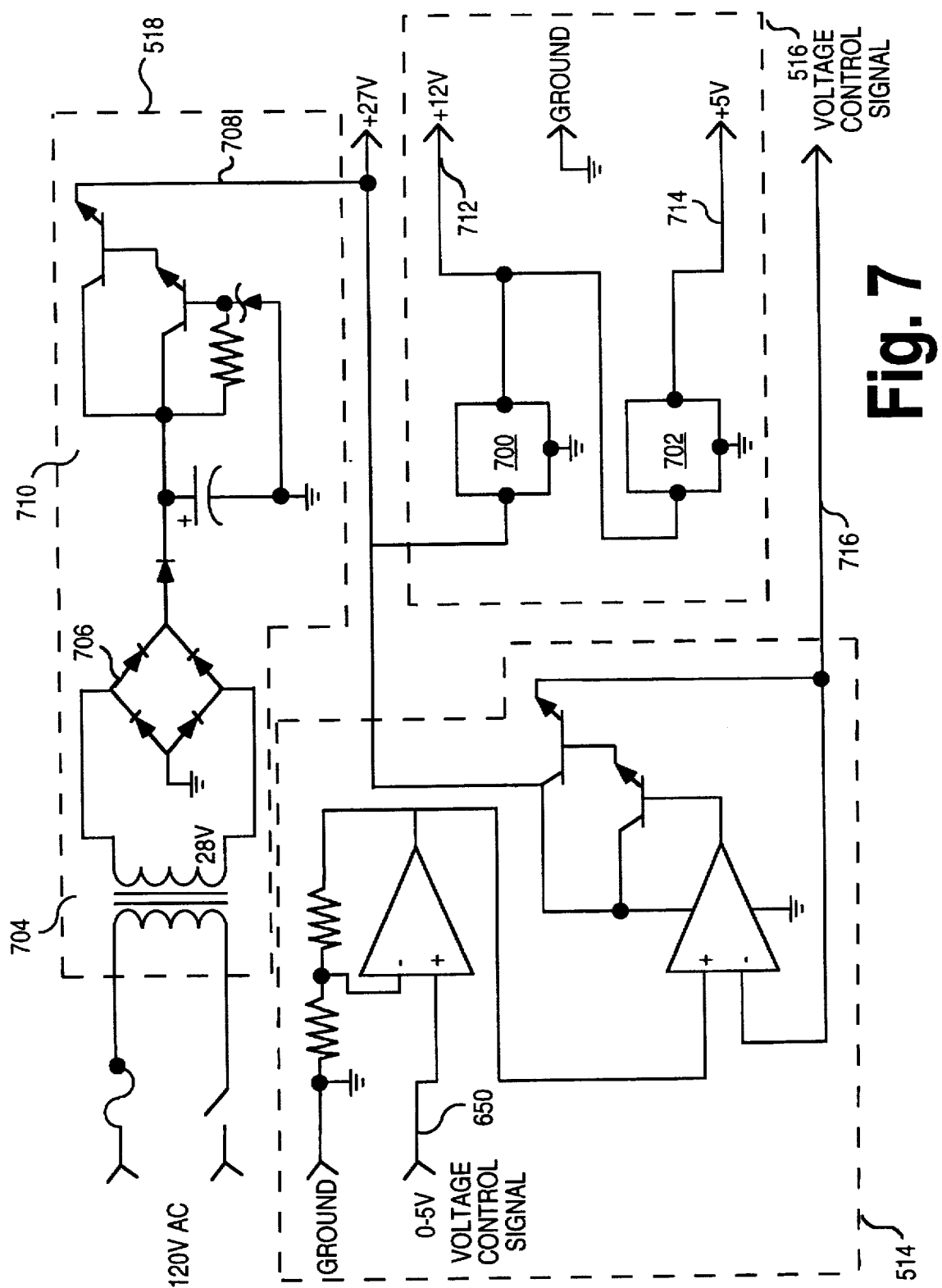
FIG. 7 illustrates one possible implementation of the power supply unit shown in FIG. 5.

Voltage control signal amplifier 514 amplifies the voltage control signal generated by digital-to-analog conversion circuit 508. In one embodiment, the analog reference signal generated by digital-to-analog conversion circuit 508 fluctuates between zero and five volts. Voltage control signal amplifier 514 amplifies the analog reference signal to produce an amplified reference signal that fluctuates between zero and twenty-four volts. FIG. 7 illustrates one implementation of power supply unit 510.

Referring now to FIG. 7, a transformer 704 transforms a standard 120 V AC signal to a lower voltage (e.g. 28 V) higher current signal which is applied to a bridge circuit 706. Bridge circuit 706 generates a DC signal from the lower voltage AC signal and transmits the DC signal through a regulator 710 to a line 708. In the illustrated embodiment, the resulting DC signal on line 708 is at 27 V. The 27 V DC signal on line 708 is passed through a voltage converter 700 (e.g. a resistor network) to produce a 12 V DC signal on a line 712. The 12 V DC signal on line 712 is passed through a second voltage converter 702 to produce a 5 V DC signal on a line 714.

The 27 V DC signal is also sent to voltage control signal amplifier 514 to provide the power to amplify the voltage control signal generated by digital-to-analog conversion circuit 508 over line 650. The voltage control signal generated by the digits-to-analog conversion circuit 508 has a voltage level between zero and five volts. The circuits within voltage control signal amplifier 514 amplify the power of the voltage control signal so that the resulting high voltage control signal generated on line 716 has substantially the same characteristics as the voltage control signal on line 650, but has a higher current and a voltage level that falls between zero and twenty-seven volts.

PULSE GENERATION UNIT

Pulse generation unit 512 generates a high-voltage discharge output capable of enabling efficacious biological molecule transfers or cell fusions based on the waveform control signal and the voltage control signal. Pulse generation unit 512 includes a high-voltage output 520, a voltage stabilizer 522, a first level pulse transformer 524, an input driver 526 and a power voltage range selector 528. Pulse generation unit 512 is shown in greater detail in FIG. 8.

Figure 8:
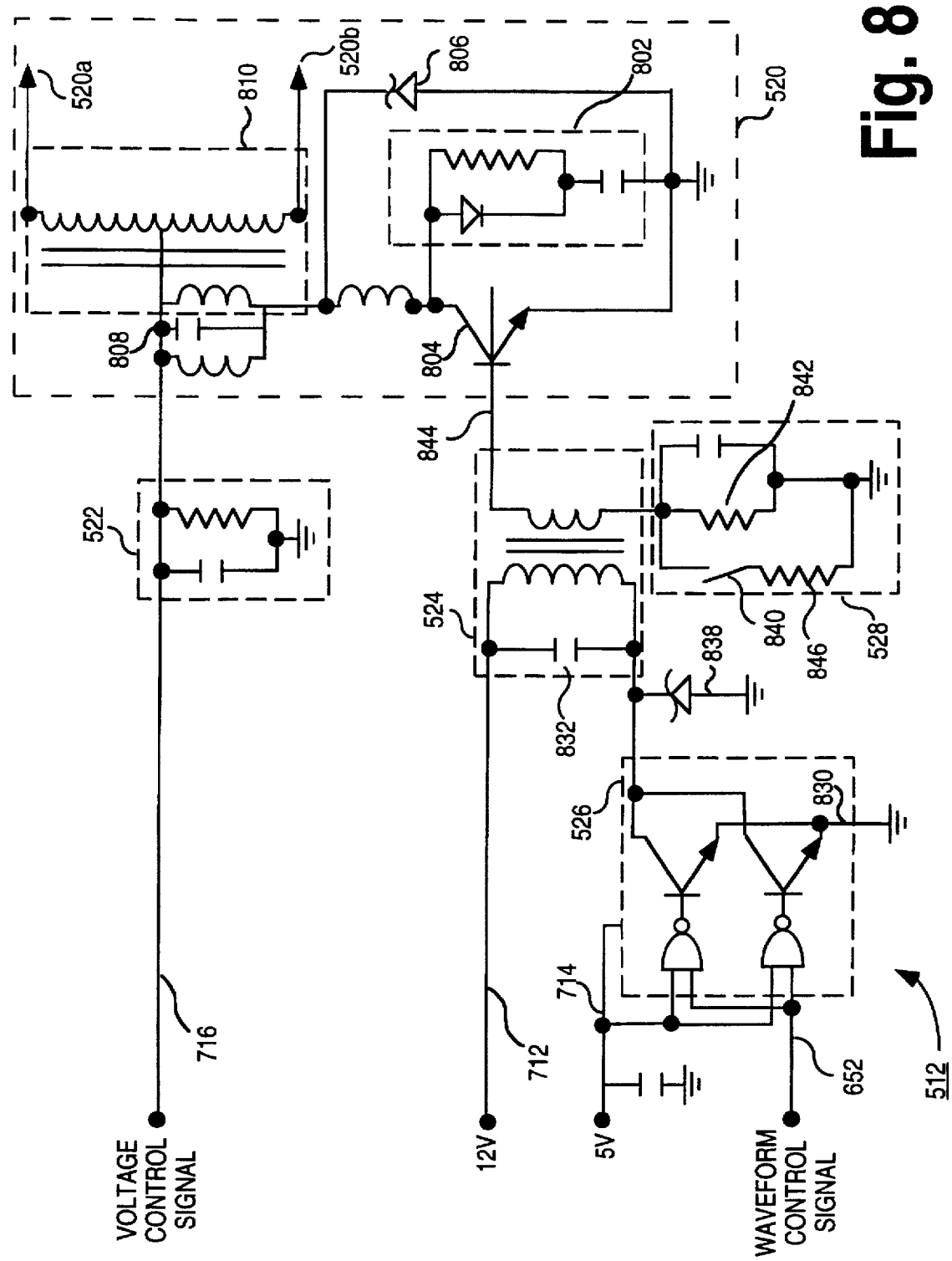
FIG. 8 illustrates one possible implementation of the pulse generation unit shown in FIG. 5.

Referring to FIG. 8 which shows an embodiment of a pulse generation unit, pulse generation unit 512 comprises a first level pulse transformer 524 for transforming the waveform control signal on line 652 from the generator 506 into an amplified waveform control signal. When the waveform control signal on line 652 goes low, current flows from line 712, through transformer 524 to ground through input driver 526 over line 830.

When the waveform control signal on line 652 goes high, the circuit from line 712 to line 830 is broken. However, due to capacitor 832, current flows back through transformer 524 to line 712. Consequently, the signal applied to transformer 524 has a current that alternates based on the waveform control signal on line 652.

An input driver protection circuit 838 is used to prevent the back electromagnetic force from damaging input driver 526 during the "turn off" period. The "turn off" period is defined as that portion of the pulse duration P which falls from amplitude A to zero.

In one embodiment the waveform control signal on line 652 may specify the characteristics of parameters such as pulse duration Tp, number of pulses Np, duration of burst $T_B$, and the cycle number Cy, the number of cycles in a pulse output Nc, the group number, the timed delay between groups, and the group shape. The amplified waveform control signal, at the output of first level pulse transformer 524, on line 844 (FIG. 8) is a pulse train representing the parameters $T_B$, Cy, Np, Tp, Nc, and Group Quantity.

Power and voltage range selector 528 determines the power level of the amplified waveform control signal. When switch 842 is open, the current flow between line 844 and ground through transformer 524 is limited by the resistance of resistor 842. When switch 840 is closed, the resistance between line 844 and ground is decreased based on the resistance of resistor 846. By affecting the amount of current that flows between line 844 and ground, switch 840 affects the voltage level of the resulting amplified waveform control signal.

High-voltage output 520 includes a modulation circuit 804 for modulating the relatively low-voltage, direct-current voltage control signal on line 716. Modulation circuit 804, a conventional transistor in the preferred embodiment, employs the amplified waveform control signal as its base voltage. The output of modulation circuit 804, at its collector, is a modulating waveform control signal. The modulating waveform control signal continues to contain the characteristics of parameters $T_B$, Cy, Np and Tp, Nc, and Group Quantity. It will be appreciated that Cy represents the PULSE-QUANTITY defined above. Modulation circuit 804, therefore, uses the modulating waveform control signal to modulate the direct-current voltage control signal into the modulated system voltage signal. The modulated system voltage signal, (appearing on lines 520a and 520b which are coupled to electrodes, such as electrodes 903 and 905) thus, contains (over time as a waveform) the characteristics of parameters A, $T_B$, Np, Tp, Cy, Nc, Group Quantity and Group Shape. This signal will also reflect the timed delay between the pulse groups, as specified by the software on the computer.

A snubber circuit 802 is provided to control the operation of modulation circuit 804. Snubber circuit 802, a capacitive-resistive network circuit in the preferred embodiment, is capable of generating a negative voltage potential to "turn off" modulation circuit 804 as fast as possible during the "turn off" periods of the pulses of first level pulse transformer 524.

Three modulation protection circuits are also provided: modulation protection circuit 806, and snubber circuit 808. Snubber circuit 808 is a capacitive-inductive network circuit adapted to reduce the power dissipation of modulating modulation circuit 804 during the "turn off" period. Modulation protection circuit 806 is used to prevent the back electromagnetic force from damaging modulation circuit 804.

Pulse generation unit 512 also comprises an output transformer circuit 810 for transforming the modulated system voltage into the high-voltage discharge output. The high-voltage discharge output appearing at outputs 520a and 520b and, containing the characteristics of parameters A, $T_B$, Cy, Np, Tp, Nc and GROUP QUANTITY and GROUP SHAPE, is a chain of continuously discharging pulses. The voltage level of the pulses is determined by the 0–24 V voltage control signal on line 716 that is used to drive output transformer circuit 810.

In the preferred embodiment, processor 102 executes an application that cause user interface controls to be generated on display 121. The user interface controls allow a user to specify an operation by selecting the number of pulse groups for the operation and the characteristics of each of the pulse groups and the timed delay gap between the pulse groups. As mentioned above, the characteristics of pulse groups include GROUP-SHAPE and PULSE-QUANTITY. In one embodiment, the controls allow a user to select the parameters that will be altered to vary the magnitude of pulse outputs during an operation. The selected parameters may include one or more of the parameters that affect pulse output magnitude (No, Np, A, Tp, $T_B$ and D). In addition, the GROUP SHAPE, GROUP-QUANTITY, the timed delay gap, and the number of cycles (Cy) in a pulse group (PULSE-QUANTITY) may be specified by the user in order to select a particular type of molecule transfer operation. In one embodiment, these various parameters for a particular molecule transfer may be stored on a computer readable medium (e.g. device 107). The user may from a visual display listing various different molecule transfers, select a particular one (the desired molecule transfer) and the computer can retrieve the parameters for the desired transfer and provide these parameters to the bus connector 130 which then causes the electronic pulse generating circuit to deliver the selected pulses to the solution in the reactor chamber, such as the chamber which includes dish 901 and electrodes 903 and 905.

Once the information entered by the user has been entered, the application determines the data that must be sent to bus connector 130 perform the specified operation. During the operation, the application sends the data over bus 101 to connector 130 to control the characteristics of the pulses being generated by electronic pulse generating circuit 140. The transmission of the parameter data is timed to deliver the number and type of pulse groups that were specified by the user.

According to one embodiment of the invention, the distance D between the electrode 142 and the solution may also be selected as a parameter to vary during an operation. In this embodiment, electrode 142 (or electrode 905) is connected to a positioning mechanism (not shown) controlled by computer system 100. During an operation, the application transmits a control signal to the positioning mechanism to vary the distance D. The control signal is timed so as to deliver the pulse groups specified by the user.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A method for using a computer system to control a cell transfer operation, the method comprising the steps of:
    delivering a first pulse output to a solution during a first cell transfer operation, wherein the first pulse output has a first magnitude determined by a plurality of operational parameters that includes at least two of the following digital parameters: number of cycles in a pulse output, number of pulses within a cycle, amplitude of individual pulses in each cycle, pulse voltage, pulse time of individual pulses in each cycle, a burst time of a cycle, wherein the burst time comprises the sum of action time and relaxation time, and distance between an electronic pulse delivery device and a solution, wherein said plurality of digital parameters affects magnitude of said first pulse output;
    causing said computer system to modify at least two of said plurality of operational parameters after delivering said first pulse output and prior to delivering a second pulse output; and
    delivering said second pulse output to said solution during said first cell transfer operation, wherein the second pulse output has a second magnitude determined by said modified plurality of operational parameters, wherein the second magnitude is different from the first magnitude and wherein said first pulse output and said second pulse output are capable of inducing an alteration of a cell membrane to facilitate said first cell transfer operation.

2. The method of claim 1 wherein:
    said step of delivering said first pulse output comprises the step of delivering a first series of individual pulses to said solution during a first series of cycles, said first pulse output being a first cumulative pulse of said first series of individual pulses;
    said step of delivering said second pulse output comprises the step of delivering a second series of individual pulses to said solution during a second series of cycles, said second pulse output being a second cumulative pulse of said second series of individual pulses.

3. The method of claim 1 wherein:
    the method includes the steps of
        delivering a first pulse group to said solution, and
        delivering a second pulse group to said solution;
    said first pulse output is a last pulse output in said first pulse group and said second pulse output is a first pulse output in said second pulse group; and said step of causing said computer system to modify at least two parameters of said plurality of operational parameters comprises causing said computer system to modify at least two parameters of said plurality of operational parameters after delivering said first pulse group and before delivering said second pulse group.

4. The method of claim 1 wherein:

the method includes the step of delivering a pulse group to said solution;

both said first pulse output and said second pulse output are in said pulse group; and said step of causing said computer system to modify at least two parameters of said plurality of operational parameters comprises causing said computer system to modify at least two parameters of said plurality of operational parameters while delivering said pulse group.

5. A method for using a computer system to control a cell transfer operation, the method comprising the steps of:

a) receiving input from a user indicating a selected pulse group shape;

b) delivering a pulse group having said selected pulse group shape to a solution by b1) causing said computer system to set at least two parameters of a plurality of digital parameters based on said selected pulse group shape, said plurality of parameters includes at least two of the following parameters: number of cycles in a pulse output, number of pulses within a cycle, amplitude of individual pulses in each cycle, pulse voltage, pulse time of individual pulses in each cycle, a burst time of a cycle, wherein the burst time comprises the sum of action time and relaxation time, and distance between an electronic pulse delivery device and a solution, wherein said plurality of digital parameters affects magnitude of said pulse output, which in turn affects said selected pulse group shape;

b2) delivering said pulse output to said solution, wherein said pulse output has a magnitude determined by said plurality of distal parameters and said pulse output is capable of inducing an alteration of a cell membrane to facilitate said cell transfer operation; and b3) repeating steps b1) and b2) for a certain number of pulse outputs.

6. The method of claim 5 further comprising the step of receiving input from a user indicating said certain number of pulse outputs.

7. The method of claim 5 further comprising the steps of:

receiving input from a user indicating a number of pulse groups in an operation; and repeating steps a) and b) for said number of pulse groups.

8. The method of claim 5 wherein:

said computer system has a display device;

the step of receiving input from a user indicating a selected pulse group shape includes generating on said display device a plurality of user interface controls for receiving said input indicating said selected pulse group shape.

* * * * *